United States Patent
Huang et al.

(10) Patent No.: US 12,435,578 B2
(45) Date of Patent: Oct. 7, 2025

(54) EARTH AUGER

(71) Applicant: Greenworks (Jiangsu) Co., Ltd, Jiangsu (CN)

(72) Inventors: Fei Huang, Jiangsu (CN); Zhikun Wang, Jiangsu (CN); Shangyu Xi, Jiangsu (CN); Bingtan Chen, Jiangsu (CN); Hexin Yang, Jiangsu (CN)

(73) Assignee: Greenworks (Jiangsu) Co., Ltd, Changzhou (CN)

( * ) Notice: Subject to any disclaimer, the term of this patent is extended or adjusted under 35 U.S.C. 154(b) by 0 days.

(21) Appl. No.: 18/782,023

(22) Filed: Jul. 24, 2024

(65) Prior Publication Data
US 2024/0376785 A1 Nov. 14, 2024

Related U.S. Application Data

(63) Continuation of application No. PCT/CN2023/072763, filed on Jan. 18, 2023.

(30) Foreign Application Priority Data

Jan. 28, 2022 (CN) .......................... 202210106634.X
Jan. 28, 2022 (CN) .......................... 202220241685.9
Jan. 28, 2022 (CN) .......................... 202220242498.2

(51) Int. Cl.
*E21B 11/00* (2006.01)
*E21B 44/00* (2006.01)
(Continued)

(52) U.S. Cl.
CPC ............ *E21B 11/005* (2013.01); *E21B 44/00* (2013.01); *F16H 57/02* (2013.01); *H02K 7/116* (2013.01);
(Continued)

(58) Field of Classification Search
CPC ........ E21B 11/005; E21B 44/00; F16H 57/02; F16H 2057/02034; H02K 7/116; H02K 9/06
See application file for complete search history.

(56) References Cited

U.S. PATENT DOCUMENTS

| | | | |
|---|---|---|---|
| 2022/0003109 A1* | 1/2022 | Zhang | E21B 44/02 |
| 2023/0082354 A1* | 3/2023 | Ramírez Ozuna | E21B 25/16 175/45 |
| 2023/0358101 A1* | 11/2023 | Chung | E21B 11/005 |

FOREIGN PATENT DOCUMENTS

| | | |
|---|---|---|
| CN | 109220081 A | 1/2019 |
| CN | 110328386 A | 10/2019 |

OTHER PUBLICATIONS

International Search Report of PCT Patent Application No. PCT/CN2023/072763 issued on Apr. 14, 2023.

* cited by examiner

*Primary Examiner* — Dany E Akakpo

(57) ABSTRACT

An earth auger includes a transmission assembly arranged on a connecting base, a motor assembly connected with the transmission assembly and driving the transmission assembly to rotate, a controller arranged at a first side of the transmission assembly and connected with the motor assembly, a control knob and a plurality of indicator lights arranged on a housing, and a gyroscope sensor. The controller controls a rotation of the motor assembly through an on-off of a circuit. Angular velocities and angular acceleration critical values of different gears are set through the control knob. The indicator lights are used to display a current gear, and the gyroscope sensor is arranged on a second side of the transmission assembly. The gyroscope sensor obtains angular velocity information and angular acceleration information, and feedbacks a monitored signal (Continued)

to the controller. When the monitored signal exceeds a preset critical value, the controller stops the motor.

14 Claims, 21 Drawing Sheets

(51) Int. Cl.
*F16H 57/02* (2012.01)
*H02K 7/116* (2006.01)
*H02K 9/06* (2006.01)

(52) U.S. Cl.
CPC ..... *H02K 9/06* (2013.01); *F16H 2057/02034* (2013.01); *F16H 2057/02073* (2013.01)

EARTH AUGER

CROSS REFERENCE TO RELATED APPLICATION

The present application is a continuation application of PCT application No. PCT/CN2023/072763 filed on Jan. 18, 2023, which claims the benefit of CN202220241685.9 filed on Jan. 28, 2022, CN202220242498.2 filed on Jan. 28, 2022 and CN202210106634.X filed on Jan. 28, 2022. All the above are hereby incorporated by reference for all purposes.

TECHNICAL FIELD

The disclosure relates to a technical field of power tools, in particular to an earth auger.

BACKGROUND

Earth augers are widely used in seedling landscaping projects on slopes, sandy lands and hard lands, such as planting pits, digging holes for fertilization of trees, and cultivating and weeding in landscaping projects. However, when drilling in a ground, it is possible to get stuck due to foreign objects such as tree roots or stones. Then, the earth auger will deflect so that it loses balance or even loses control, which causes a danger to the operator. If the working state of the earth auger cannot be fed back to the operator in time, it may cause serious injury accidents, or in a case of stuck, there will be a large reaction torque transmitted to the operator, and once the reaction torque is beyond the control range of the operator, it will lead to the loss of control of the earth auger and cause injury accidents.

In addition, the earth auger includes a handle to control the earth auger, but an assembly parting surface of the conventional handle assembly is arranged parallel to a symmetrical plane of the entire earth auger, which results in an angle between the wrist and the arm during an actual use of the earth auger, and cause discomfort during exertion.

In view of the above problems, it is necessary to provide a new earth auger to solve the above problems.

SUMMARY

The disclosure provides an earth auger. The earth auger includes a transmission assembly, motor assembly, controller, control knob, a plurality of the indicator lights and a gyroscope sensor.

The transmission assembly is arranged on a connecting base.

The motor assembly is connected with the transmission assembly, and configured to drive the transmission assembly to rotate.

The controller is arranged at a first side of the transmission assembly, connected with the motor assembly, and configured to control a rotation of the motor assembly through an on-off of a circuit.

The control knob and a plurality of the indicator lights are arranged on the housing, are set through the control knob is configured to set critical values of angular velocities of different gears and set critical values of angular acceleration of different gears, and the indicator lights are configured to display a current gear.

The gyroscope sensor is arranged at a second side of the transmission assembly.

Wherein, the gyroscope sensor is configured to obtain angular velocity information and angular acceleration information during a movement of the earth auger, to feedback a monitored signal to the controller, and when the monitored signal exceeds a preset critical value of the current gear, the controller stops power supply to stop the motor from rotating.

In an embodiment of the disclosure, the housing includes a first housing and a second housing, and the controller is arranged on the first housing.

In an embodiment of the disclosure, tops of the first housing and the second housing form an opening.

In an embodiment of the disclosure, the cover is arranged on the opening.

In an embodiment of the disclosure, the control knob and the plurality of the indicator lights are arranged on the cover, and the control knob is connected with the controller to set the critical values of the angular velocities and the critical values of the angular acceleration of different gears.

In an embodiment of the disclosure, the gyroscope sensor is connected with the controller and feedbacks a monitored signal of the angular velocities and a monitored signal of the angular accelerations to the controller.

In an embodiment of the disclosure, the indicator lights include a first indicator light, a second indicator light and a third indicator light, the first indicator light, the second indicator light and the third indicator light are adjusted by the control knob to display the current gear.

In an embodiment of the disclosure, the gyroscope sensor is configured to monitor the signals of the angular velocity signal and the angular acceleration of the earth auger in real time, and filter noise information to obtain a real-time working state of the earth auger.

In an embodiment of the disclosure, the transmission assembly includes a first transmission portion and a second transmission portion, one end of a first bearing component of the first transmission portion is provided with a connecting gear, and the first transmission portion is connected with the second transmission portion through the connecting gear.

In an embodiment of the disclosure, one end of a transmission shaft of the second transmission portion is provided with a drill pipe connector, and the drill pipe connector is connected with a drill bit and configured to drive the drill bit to rotate.

In an embodiment of the disclosure, the earth auger further includes a bracket installed with an anti-impact assembly. The anti-impact assembly includes a blocking plate, a plurality of fastening bolt assemblies and a plurality of buffer components.

The plurality of fastening bolt assemblies passes through the blocking plate and mounted with the bracket.

The plurality of buffer components are sleeved on the fastening bolt assembly and located between the blocking plate and the bracket.

In an embodiment of the disclosure, a plurality of first mounting holes and a plurality of second mounting holes are arranged on the bracket, the first mounting holes are disposed coaxially with the second mounting holes, and a diameter of the first mounting hole is larger than a diameter of the second mounting hole.

In an embodiment of the disclosure, the anti-impact assembly further includes a plurality of guide sleeves, the guide sleeves are arranged in the bracket from the first mounting holes, and a limit is defined between the guide sleeve and the bracket.

In an embodiment of the disclosure, a diameter of the guide sleeve is larger than a diameter of the second mounting hole, and is matched with a diameter of the first mounting hole.

In an embodiment of the disclosure, the fastening bolt assembly is configured to penetrate through the blocking plate and the guide sleeve, and connect the blocking plate and the guiding shaft sleeve to the bracket.

One or more embodiments of the disclosure provide the earth auger. When drilling to a foreign body such as a root of a tree or a stone which may cause a loss of balance or stuck, the dangerous state is monitored in real time, and the danger information is transmitted to an operator and an emergency stop is controlled, so that an occurrence of accidents may be effectively prevented, and an operation safety is improved. The earth auger may be used in a variety of surface environments. When the earth auger is out of control due to the stuck during working, it may monitor an abnormal signal at this time, and immediately feedback a control signal to the control assembly to require the earth auger to stop urgently, so as to avoid injury to the operator. The earth auger of the disclosure may adapt to a safety monitoring and early warning of complex terrain and different operating conditions.

BRIEF DESCRIPTION OF THE DRAWINGS

In order to explain technical solutions of embodiments of the disclosure more clearly, the following will briefly introduce drawings used in a description of the embodiments or the conventional art. Obviously, the drawings in the following description are only some embodiments of the disclosure. For those of ordinary skill in the art, other drawings may be obtained based on these drawings without creative work.

DETAILED DESCRIPTION

Figure 1:
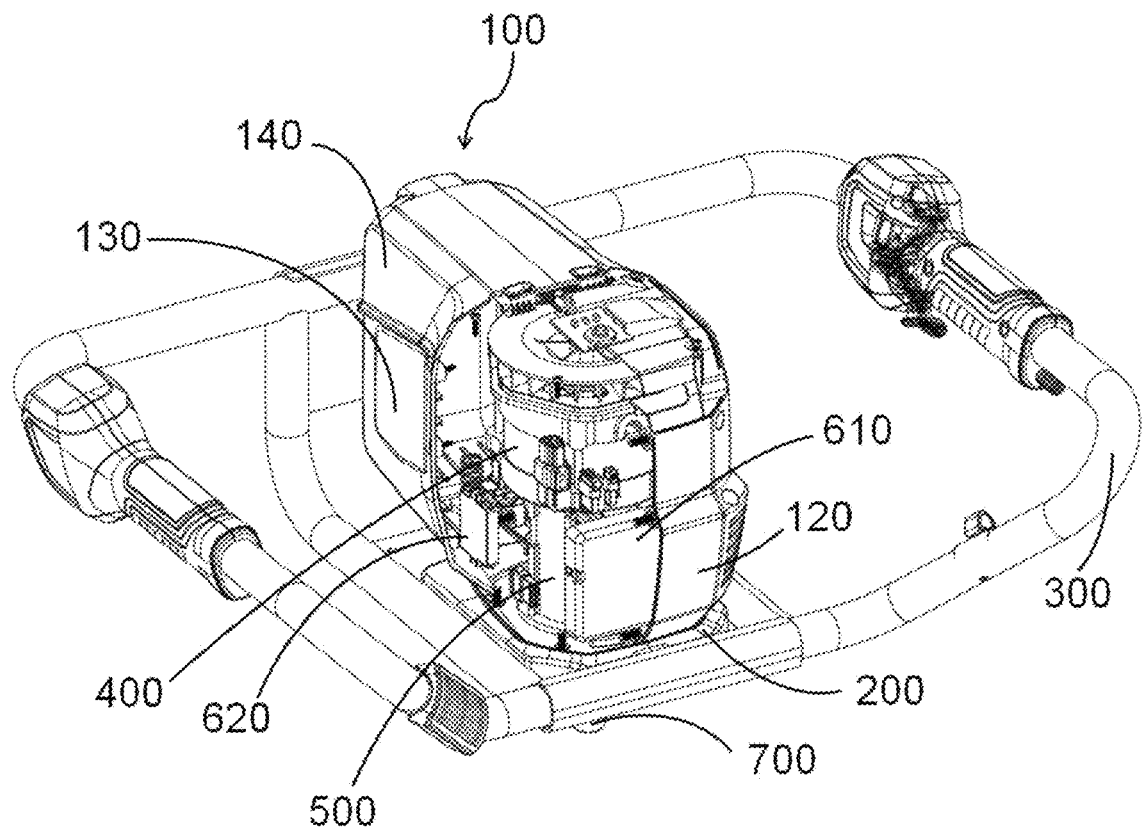
FIG. 1 is a schematic structural view of an earth auger according to at least one embodiment of the disclosure.

The following describes the implementation of the disclosure through specific embodiments, and those skilled in the art can easily understand other advantages and effects of the disclosure from the content disclosed in this specification. The disclosure may also be implemented or applied through other different specific embodiments. Various details in this specification may also be modified or changed based on different viewpoints and applications without departing from the disclosure.

It should be noted that drawings provided in the embodiments are only illustrative of a basic idea of the disclosure. The drawings only show assemblies related to the disclosure instead of drawing according to the number, shape and size of the assemblies in actual implementation. In actual implementation, the type, quantity and ratio of each assembly may be changed at will, and a layout of the assemblies may also be more complicated.

The disclosure provides the earth auger. When the drill bit is out of balance or even out of control, a dangerous state is monitored in real time, danger information is transmitted to an operator, and an emergency stop is controlled. This prevents accidents and improves an operational safety.

Please refer to FIG. 1 through FIG. 16. In an embodiment of the disclosure, the earth auger 1000 further includes a housing 100, a connecting base 200, a motor assembly 400, a transmission assembly 500, a control assembly 600 and a drill pipe connector 700. In an embodiment, the control assembly 600 includes a controller 610 and a gyroscope sensor 620. In an embodiment of the disclosure, the transmission assembly 500 is arranged on the connecting base 200. The motor assembly 400 is connected with the transmission assembly 500, and the motor assembly 400 drives the transmission assembly 500 to rotate. The controller 610 is arranged at a first side of the transmission assembly 500, connected with the motor assembly 400, and the controller 610 is configured to control a rotation of the motor assembly 400 through an on-off of a circuit. A control knob 1501 and a plurality of indicator lights 1502 are arranged on the housing, critical values of angular velocities and angular acceleration of different gears are set through the control knob 1501, and the indicator lights 1502 are configured to display a current gear. The gyroscope sensor 620 is arranged at a second side of the transmission assembly 500, used to obtain angular velocity information and angular acceleration information during a movement of the earth auger, and feedback a monitored signal to the controller 610. When the monitored signal exceeds a preset critical value of the current gear, the controller 610 stops power supply to stop the motor from rotating.

Figure 2:
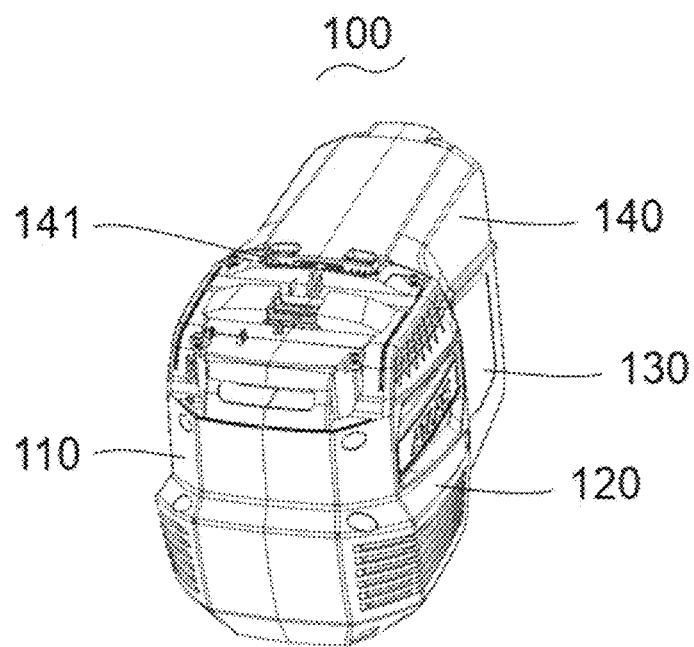
FIG. 2 is a schematic structural view of a housing according to at least one embodiment of the disclosure.
Figure 3:
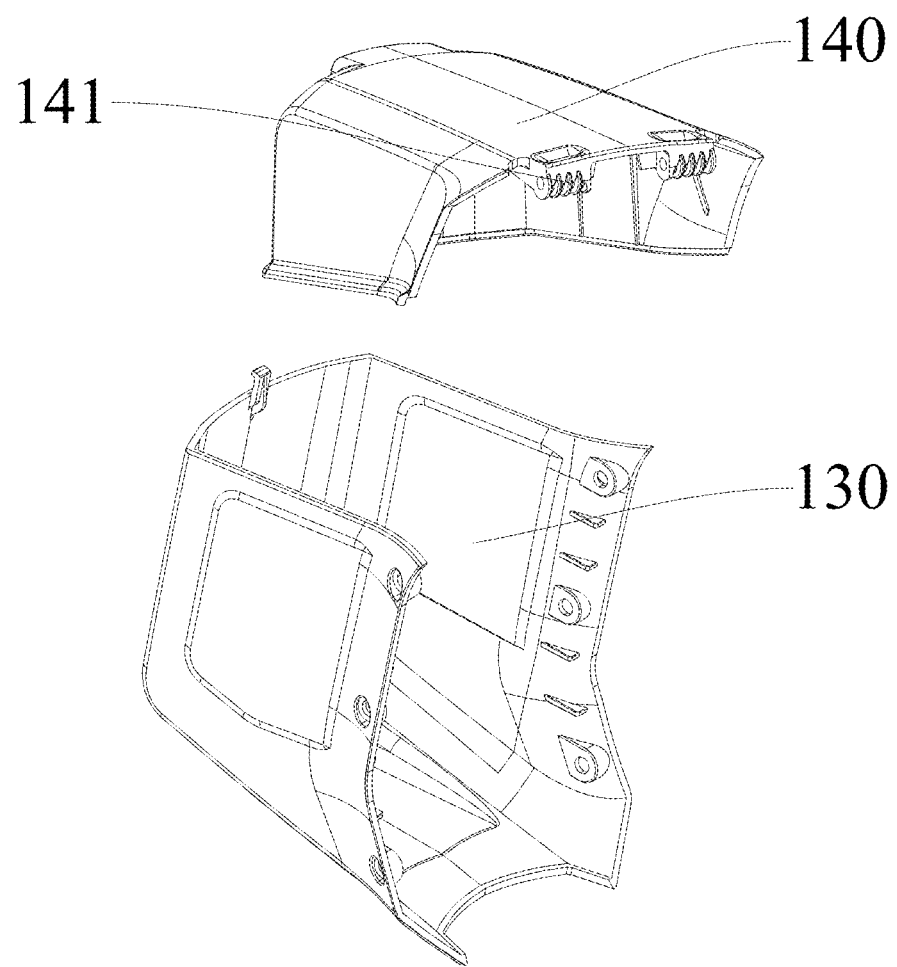
FIG. 3 is a schematic view of a rear housing according to at least one embodiment of the disclosure.
Figure 4:
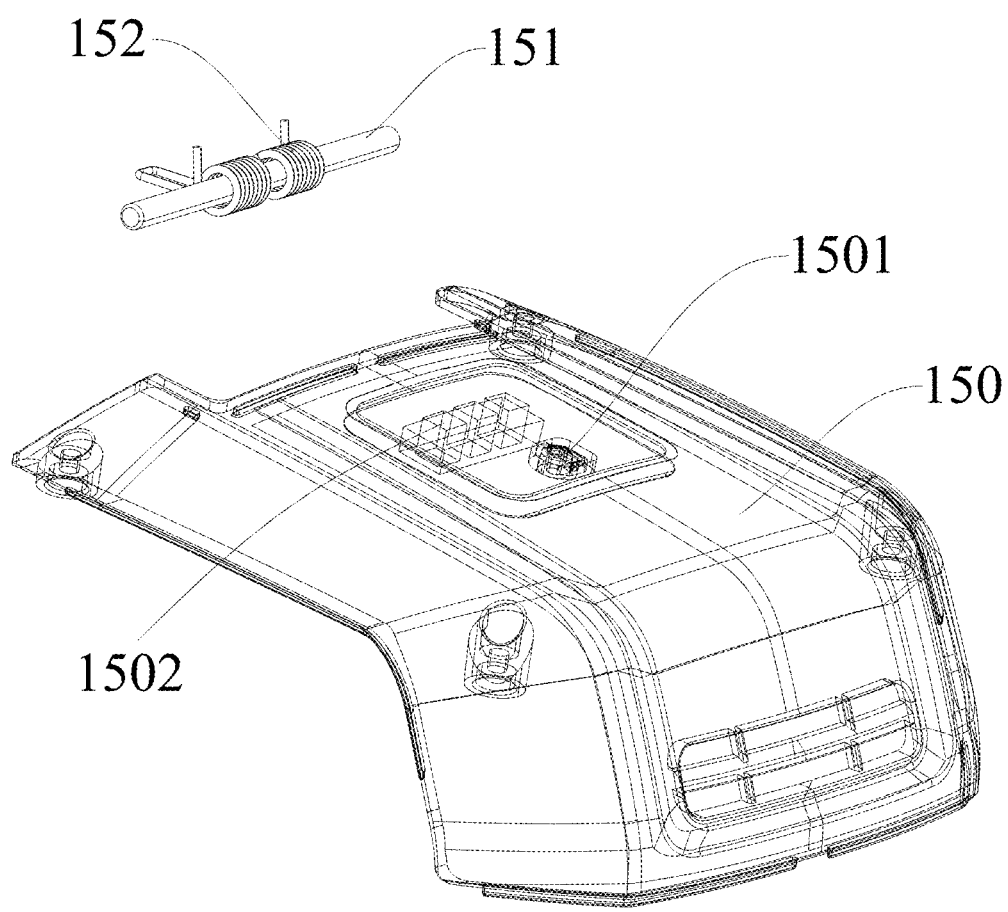
FIG. 4 is a schematic structural view of a cover according to at least one embodiment of the disclosure.

Please refer to FIG. 2, FIG. 3 and FIG. 4. FIG. 3 is a schematic view of a rear housing according to at least one embodiment of the disclosure. In an embodiment of the disclosure, the housing 100 may include a first housing 110, a second housing 120 and a rear housing, while the rear housing may further include a bottom housing 130 and a top housing 140. The first housing 110, the second housing 120, the bottom housing 130 and the top housing 140 may form a closed cavity with a top opening, and the cavity may accommodate an internal structure of the earth auger of the disclosure. In an embodiment of the disclosure, the top housing 140 further includes a clamping groove 141, and the clamping groove 141 is located at an edge of the opening at the top of the housing. In an embodiment of the disclosure, the clamping groove 141 is used to be connected with a covering component on the top of the housing, which means connected with a cover 150.

Please refer to FIG. 4. FIG. 4 is a schematic structural view of the cover according to at least one embodiment of the disclosure. In an embodiment of the disclosure, the cover 150 may be arranged at the opening of the top of the housing 100, and the cover 150 and the housing 100 may form the closed cavity. A torsion spring 152 is arranged on a rotating shaft 151, and two ends of the rotating shaft 151 may be connected with the clamping groove 141 on the top housing 140. The cover 150 is connected with the torsion spring 152, which means that the cover 150 may rotate around the rotating shaft 151. When the cover 150 is opened, the torsion spring 152 is tightened, and when an external force exerted on the cover 150 is removed, the cover 150 returns to its original position under an effect of the torsion spring 152. The control knob 1501 and the indicator light 1502 are arranged on the cover 150. In an embodiment of the disclosure, a number of indicator lights 1502 is for example three. In other embodiments of the disclosure, the number of the indicator lights may be multiple, such as four, five, six, or eight. The control knob 1501 is adjusted to be in different indication positions, and when the control knob 1501 is in the different indication positions, the different indicator lights 1502 are lighted up. At the same time, the different indicator lights 1502 correspond to different monitoring parameters, such as angular velocity, angular acceleration and time, etc. According to a type of ground, texture and operating condition, etc., the monitoring parameter of the earth auger may be changed by adjusting the control knob 1501, so as to easily adapt to a safety monitoring and early warning of complex terrain and different operating conditions.

Figure 5:
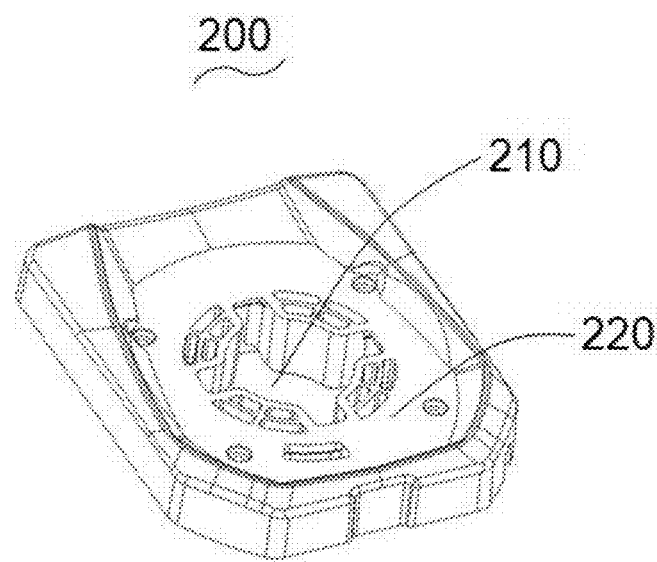
FIG. 5 is a schematic structural view of a connecting base according to at least one embodiment of the disclosure.

Please refer to FIG. 5. FIG. 5 is a schematic structural view of the connecting base according to at least one embodiment of the disclosure. In an embodiment of the disclosure, the connecting base 200 may include a hole groove 210 and a supporting surface 220. The connecting base 200 is connected with a bottom surface of the bottom housing 130, and the bottom surface of the bottom housing 130 is in contact with the supporting surface 220. In an embodiment, the bottom housing 130 and the connecting base 200 may be connected by means of a screw connection for example. During working of the earth auger, the connecting base 200 is subjected to a pressure from the bottom housing 130.

Figure 6:
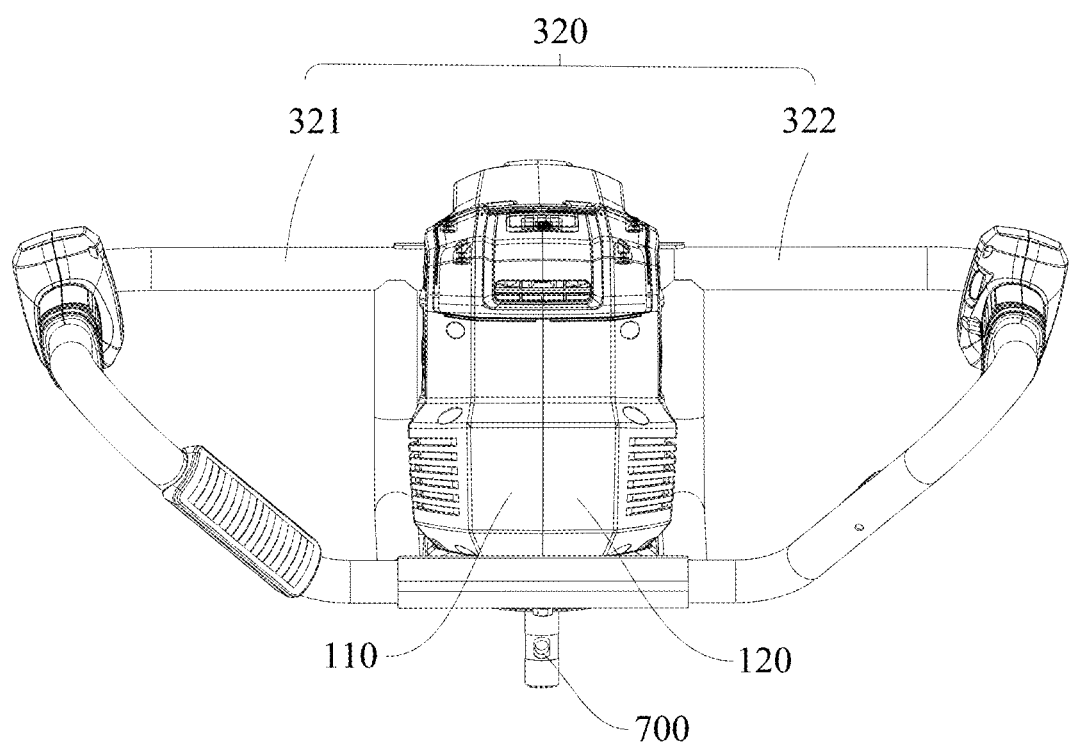
FIG. 6 is a schematic front view of the earth auger according to at least one embodiment of the disclosure.
Figure 7:
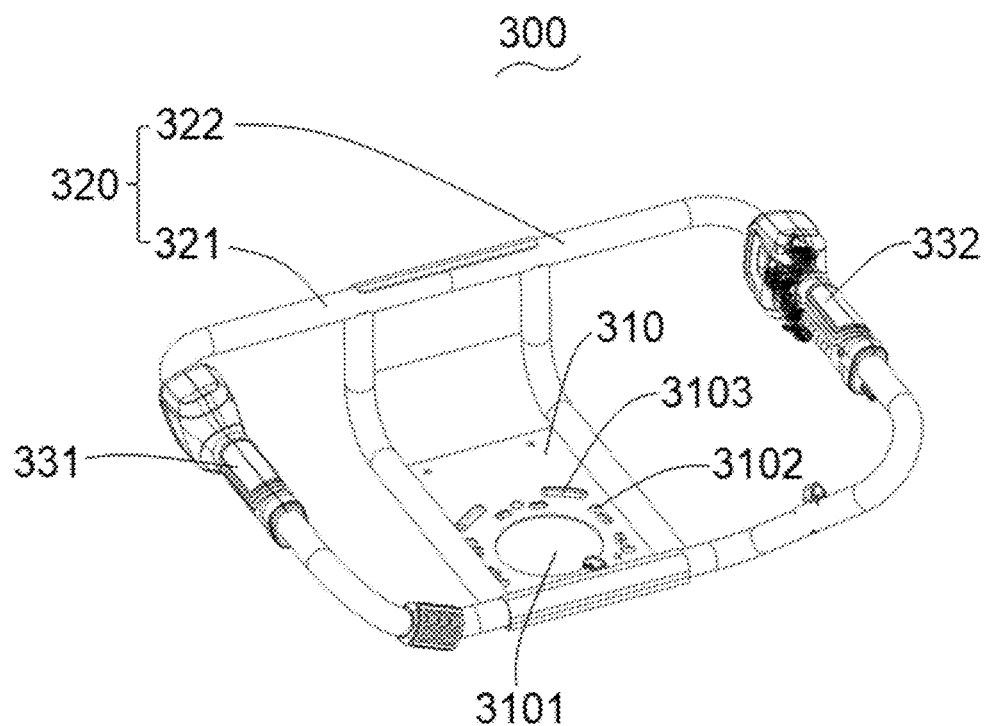
FIG. 7 is a schematic view of a bracket assembly according to at least one embodiment of the disclosure.

Please refer to FIG. 6 and FIG. 7. FIG. 6 is a schematic view of a bracket assembly according to at least one embodiment of the disclosure. In an embodiment of the disclosure, the bracket assembly 300 may include a supporting platform 310 and a bracket 320. The supporting platform 310 may be in a flat plate shape and is mounted on the bracket 320. In an embodiment, the bracket 320 may include a first bracket 321 and a second bracket 322. The first bracket 321 and the second bracket 322 are connected on two sides of the connecting base 200, and maximum heights of the first bracket 321 and the second bracket 322 relative to the connecting base 200 is less than a height of a top of the motor assembly 400 relative to the connecting base 200. In an embodiment of the disclosure, the motor assembly 400 may include a heat dissipation fan 410, a scaling cover 420, a stator 440 and a base 450. The height of the top of the motor assembly 400 relative to the connecting base 200 may be understood as a distance between the heat dissipation fan 410 and the connecting base 200.

Please refer to FIG. 6 and FIG. 7. The handle 330 is arranged on the bracket 320, and the handle 330 includes an auxiliary handle 331 and a control handle 332. In an embodiment, the auxiliary handle 331 is arranged on the first bracket 321, and the control handle 332 is arranged on the second bracket 322. The supporting platform 310 may include a through hole 3101, a connecting hole 3102 and a bearing component 3103. The through hole 3101, the connecting hole 3102 and the bearing component 3103 on the supporting platform 310 may be matched with the motor assembly 400 and the transmission assembly 500. The bearing component 3103 is used to bear moments that the motor assembly 400 and the transmission assembly 500 transmit to the supporting platform 310, and a number of bearing components 3103 may be set according to different structural requirements. When the number of bearing components 3103 is plurality, the bearing components 3103 are evenly distributed in a periphery of the through hole 3101, so that each bearing component 3103 bears nearly equal moments, so that a damage of bearing components 3103 due to uneven moments bearing is effectively avoided. In an embodiment of the disclosure, a number of connecting holes 3102 may be set according to different structural requirements. When the number of connecting holes 3102 is plurality, the supporting platform 310 and the transmission assembly 500 may be connected through a plurality of screws. The through hole 3101 and the connecting hole 3102 penetrate through the supporting platform 310 along a direction perpendicular to the supporting platform 310. In an embodiment of the disclosure, there may be three connecting holes 3102 and three bearing components 3103. The connecting holes 3102 and the bearing components 3103 are evenly distributed around the periphery of the through hole 3101, and the connecting holes 3102 and the bearing components 3103 are arranged at intervals from each other.

Figure 8:
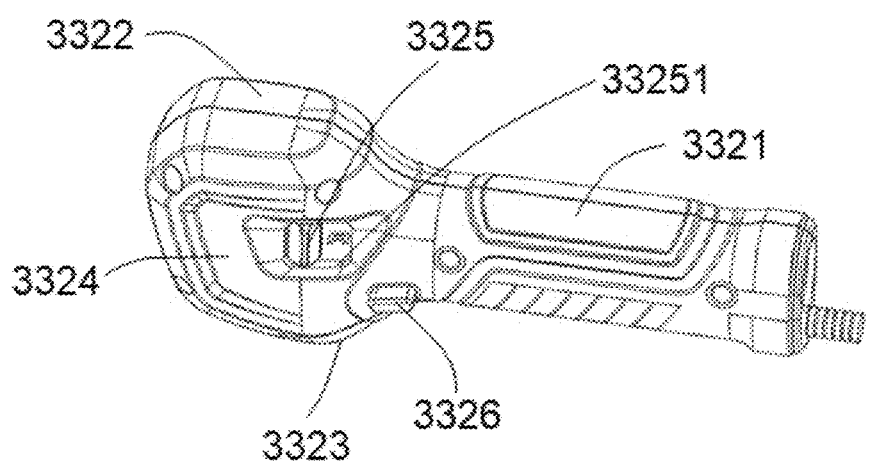
FIG. 8 is a schematic structural view of a handle according to at least one embodiment of the disclosure.

Please refer to FIG. 8. In an embodiment of the disclosure, the control handle 332 includes a control handle housing 3321, a sliding block 3325, a limiting switch 3326 and a trigger 340. In an embodiment, the control handle housing 3321 may include a top wall 3322, a bottom wall 3323 and a side wall 3324. The limiting switch 3326 passes through the side wall 3324 of the control handle housing 3321 and may move in a direction perpendicular to the side wall 3324, for example. The sliding block 3325 is arranged at an opening of the side wall 3324 and may be moved in a direction parallel to the side wall 3324, for example. In an embodiment of the disclosure, the limiting switch 3326 moves in a direction perpendicular to the side wall 3324 to limit a rotation of the trigger 340. When the limiting switch 3326 is pressed into an inside of the side wall 3324, the trigger 340 is fixed, and the trigger 340 cannot work at this moment. The sliding block 3325 moves in the direction parallel to the side wall 3324 to control a rotating direction of the earth auger.

Figure 9:
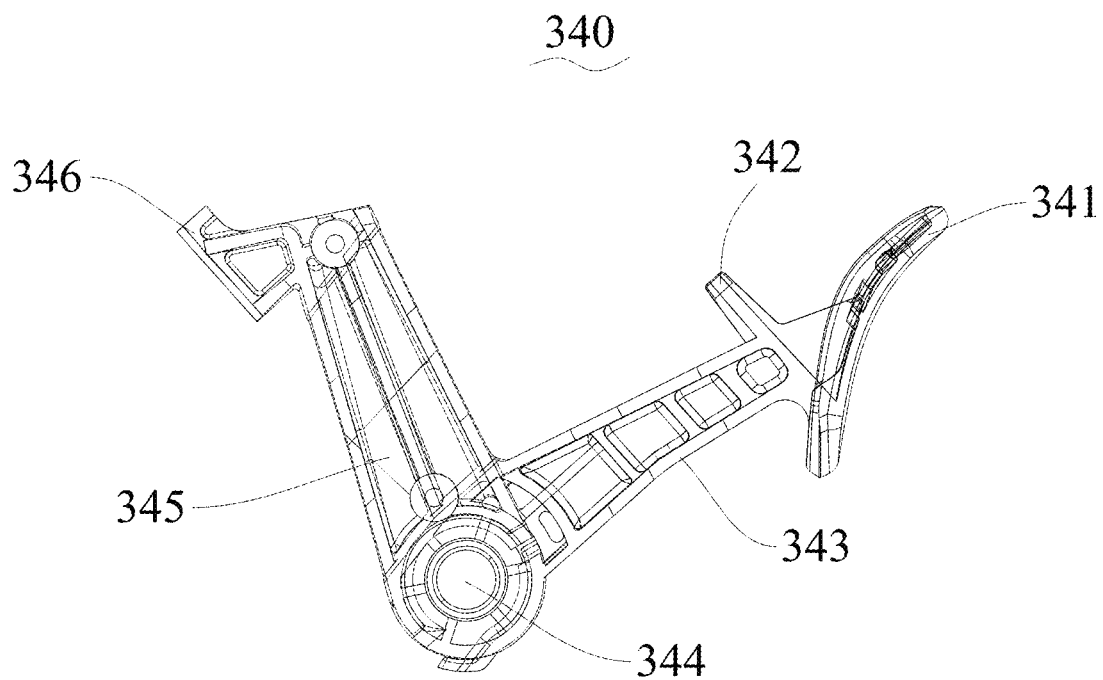
FIG. 9 is a schematic structural view of a trigger according to at least one embodiment of the disclosure.

Please refer to FIG. 9. In an embodiment of the disclosure, the trigger 340 may include a supporting part 341, a limiting part 342, a pushing arm 343, a pivot 344, a spring reset element 3441, a rotating arm 345, and a triggering head 346. In an embodiment of the disclosure, the pushing arm 343 and the rotating arm are connected with the pivot 344. In an embodiment, an end of the pushing arm 343 is provided with the supporting part 341 and the limiting part 342, and an end of the rotating arm 345 is provided with the triggering head 346. The supporting part 341 is used for contacting with the operator. When the operator presses the supporting part 341, the pushing arm 343 and the rotating arm rotate around the pivot 344. At this moment, the spring reset element 3441 is in a compression state, so as to enable the triggering head 346 to move a distance so that the switch may be turned on. When the limiting switch 3326 is pressed into an inside of the side wall 3324, the limiting switch 3326 touches the limiting part 342, and a movement of the limiting part 342 around the pivot 344 is limited. At this time, the trigger 340 is fixed and cannot work.

Figure 10:
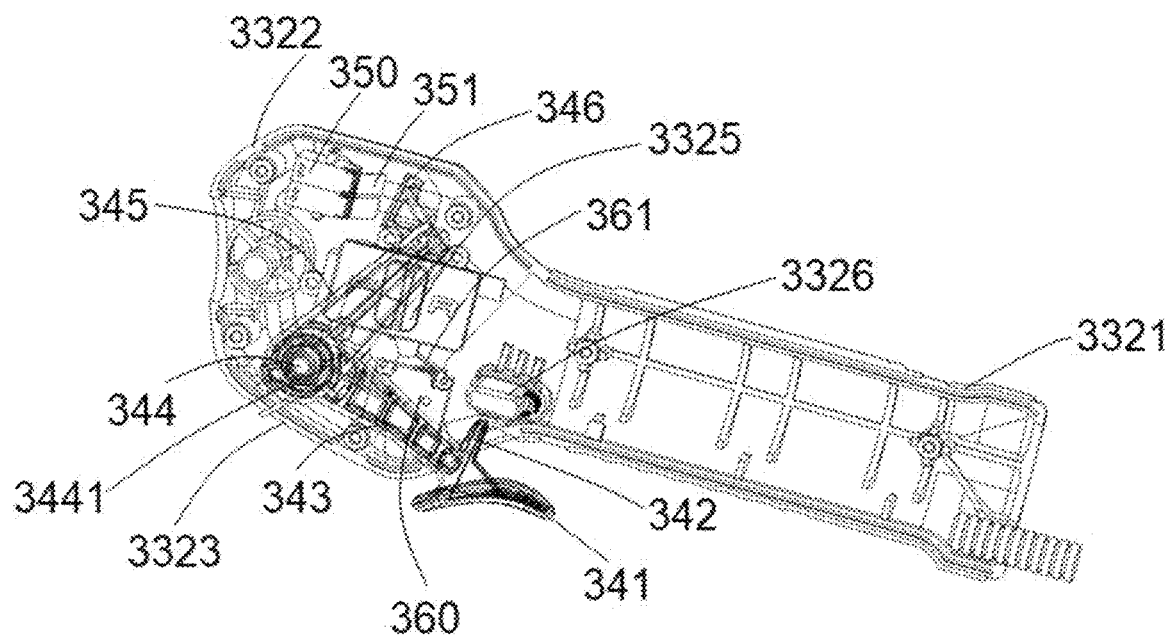
FIG. 10 is a schematic cross-sectional view of the handle according to at least one embodiment of the disclosure.

Please refer to FIG. 10. In an embodiment of the disclosure, the control handle 332 further includes a start switch 350 and a reversing switch 360. The start switch 350 includes a first contacting piece 351, and the reversing switch 360 includes a second contacting piece 361. In an embodiment, the start switch 350 may be located below the top wall 3322, and the reversing switch 360 may be located between the pivot 344 and the limiting switch 3326. When the limiting switch 3326 is pressed into the inside of the side wall 3324, the trigger 340 is fixed, and the trigger 340 cannot work at this moment. When the limiting switch 3326 ejects to an outside of the side wall 3324, the supporting part 341 of the trigger 340 is pressed. The pushing arm 343 and the rotating arm 345 of the trigger 340 rotate around the pivot 344, and the triggering head 346 moves a distance at this moment and contacts with the first contacting piece 351 of the start switch 350. The first contacting piece 351 triggers the start switch 350, so that the earth auger enters a working state. At this time, the spring reset element 3441 undergoes an elastic deformation, and the start switch 350 controls the motor assembly 400 to work. When the start switch 350 directly sends a starting signal to the motor assembly 400, the start switch 350 directly controls the motor assembly 400 to work. When the start switch 350 sends the starting signal to the control assembly 600 and the control assembly 600 controls the motor assembly 400 to work, the start switch 350 indirectly controls the motor assembly 400 to work.

When the supporting part 341 is released, the trigger 340 is reset under an action of the spring reset element 3441.

Please refer to FIG. 8 through FIG. 10. In an embodiment of the disclosure, the sliding block 3325 moves in a direction parallel to the side wall 3324 in a sliding rail 33251 to control the rotating direction of the earth auger. The sliding block 3325 is slidably mounted on the sliding rail 33251, and the reversing switch 360 is matched with the sliding block 3325. In an embodiment of the disclosure, the reversing switch 360 may be located above the sliding block 3325 in a sliding direction. When the user pushes the sliding block 3325 to slide along the sliding rail 33251, the sliding block 3325 abuts against the second contacting piece 361 of the reversing switch 360, and triggers the reversing switch 360 to work through the second contacting piece 361. At this time, the reversing switch 360 sends a reversing signal to the motor assembly 400 to control a forward rotation or a reverse rotation of the motor assembly 400. The control handle 332 guides the operator's hand shape to be in a gripped state through a matching of the start switch 350 and the reversing switch 360 and positions of the start switch 350 and the reversing switch 360 on the control handle housing 3321, so that the operator may respond to sudden large torque changes at any time, which causes that it is easy for a thumb to trigger the supporting part 341 to detach.

Figure 11:
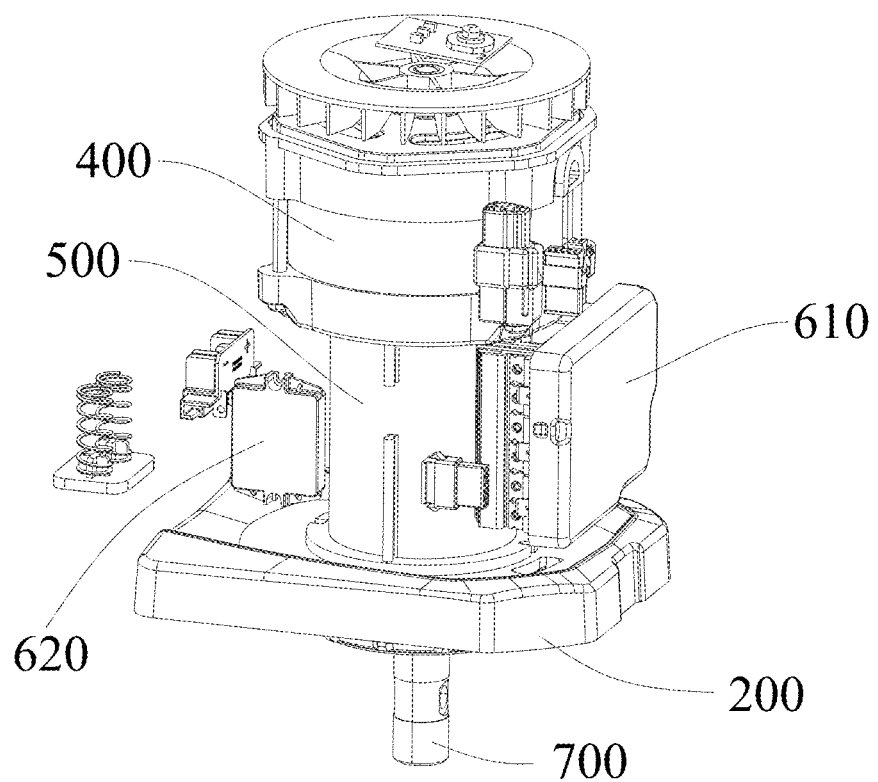
FIG. 11 is a schematic view of a working assembly of the earth auger according to at least one embodiment of the disclosure.
Figure 12:
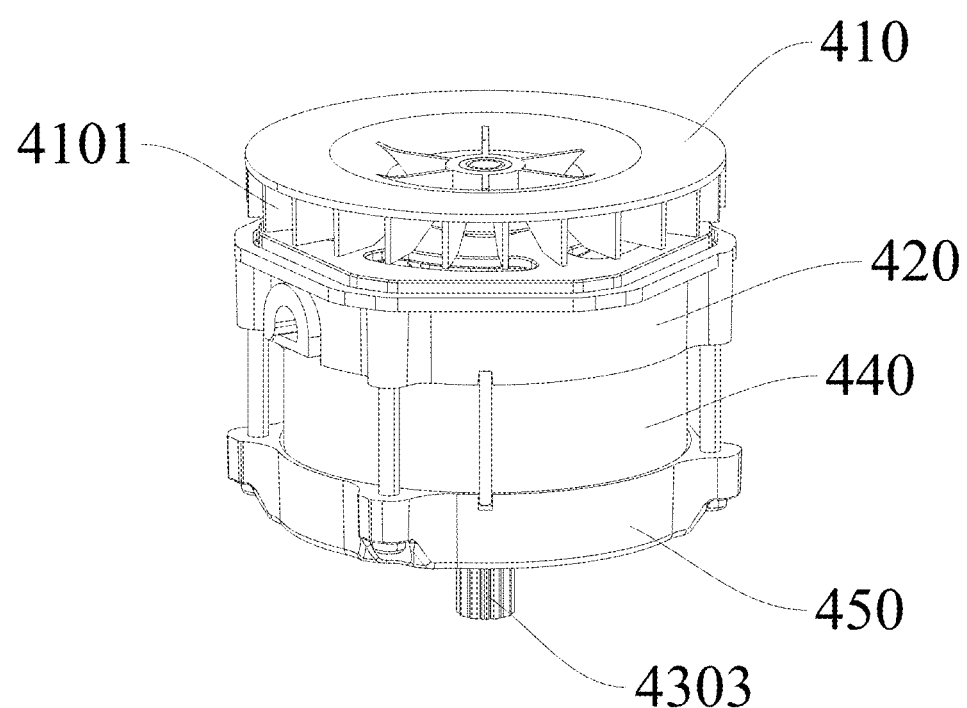
FIG. 12 is a schematic view of a motor assembly according to at least one embodiment of the disclosure.
Figure 13:
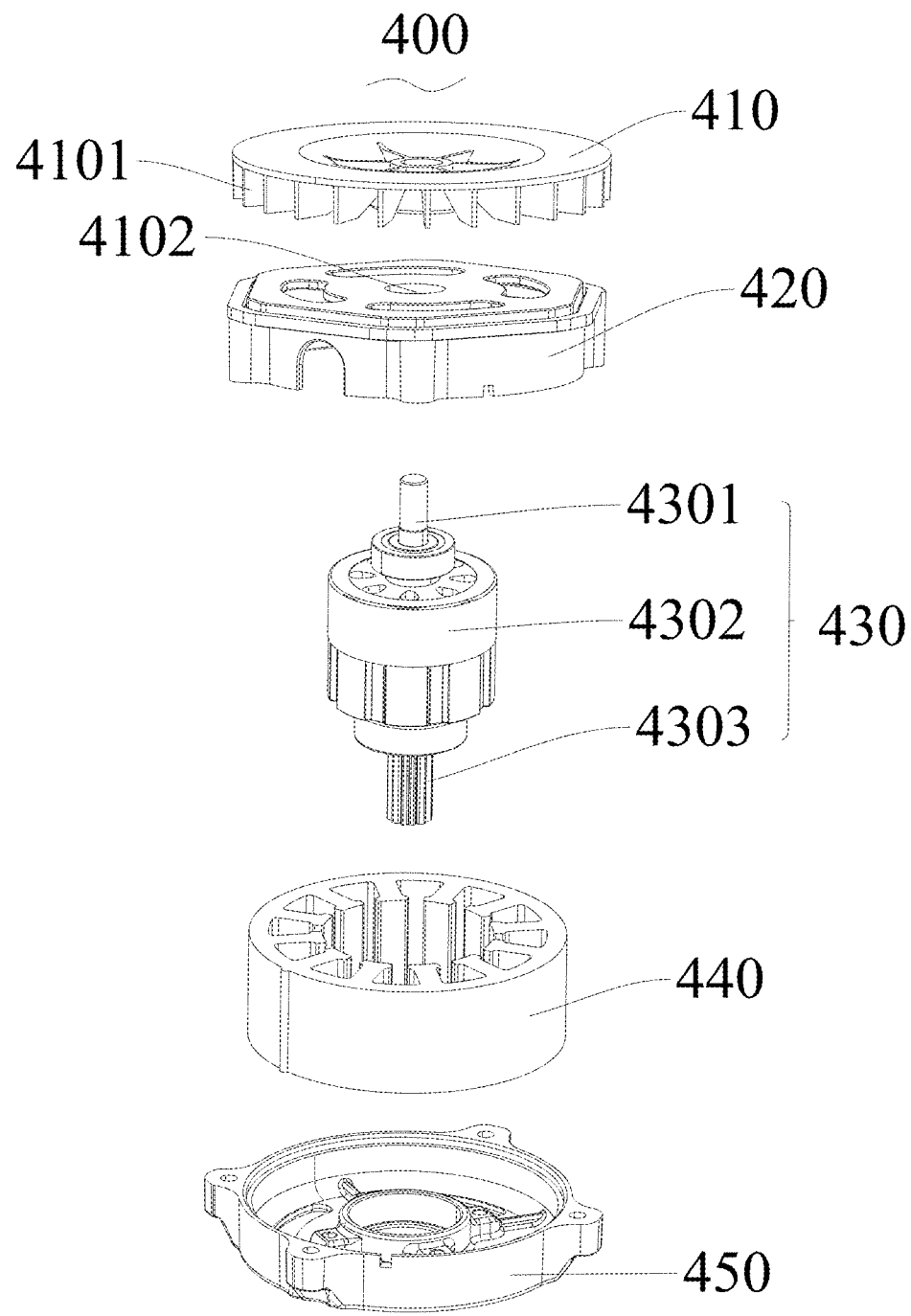
FIG. 13 is a schematic exploded view of the motor assembly according to at least one embodiment of the disclosure.

Please refer to FIG. 11 through FIG. 13. In an embodiment of the disclosure, the motor assembly 400 may include a heat dissipation fan 410, a sealing cover 420, a rotating part 430, a stator 440 and a base 450. The heat dissipation fan 410 is arranged in the sealing cover 420, and the heat dissipation fan 410 includes a plurality of blades 4101. A central axis of the heat dissipation fan 410 coincides with a central axis of the scaling cover 420. In an embodiment, a center of the sealing cover 420 is provided with a cover hole 4201, and the central axis of the heat dissipation fan 410 coincides with a central axis of the cover hole 4201. The stator 440 is located between the sealing cover 420 and the base 450, the sealing cover 420, the stator 440 and the base 450 may form an accommodating cavity, and the rotating part 430 is arranged in the accommodating cavity. The rotating part 430 includes a rotating shaft 4301, a rotor 4302 and transmission teeth 4303. A central axis of the rotating shaft 4301 coincides with the central axis of the cover hole 4201, and the rotating shaft 4301 passes through the cover hole 4201 and the heat dissipation fan 410. The rotor 4302 is arranged on the rotating shaft 4301, and one end of the rotating shaft 4301 away from the sealing cover 420 is provided with the transmission teeth 4303. When the motor is started, the rotating part 430 in the stator 440 begins to rotate. The rotating shaft 4301 drives the heat dissipation fan 410 to rotate, and the motor is air-cooled and dissipated through the blades 4101. The transmission teeth 4303 at a lower surface of the base 450 are connected with the transmission assembly 500. In an embodiment, the transmission teeth 4303 arranged at one end of the rotating shaft 4301 away from the sealing cover 420 is connected with the transmission assembly 500, a rotation of the motor is transmitted to the transmission assembly 500, and then the earth auger is driven to work.

Figure 14:
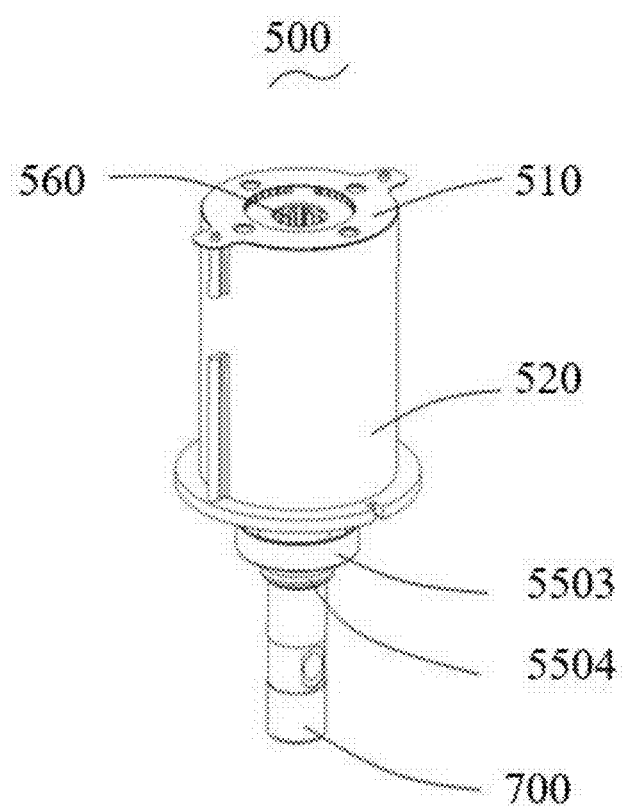
FIG. 14 is a schematic structural view of a transmission assembly according to at least one embodiment of the disclosure.
Figure 15:
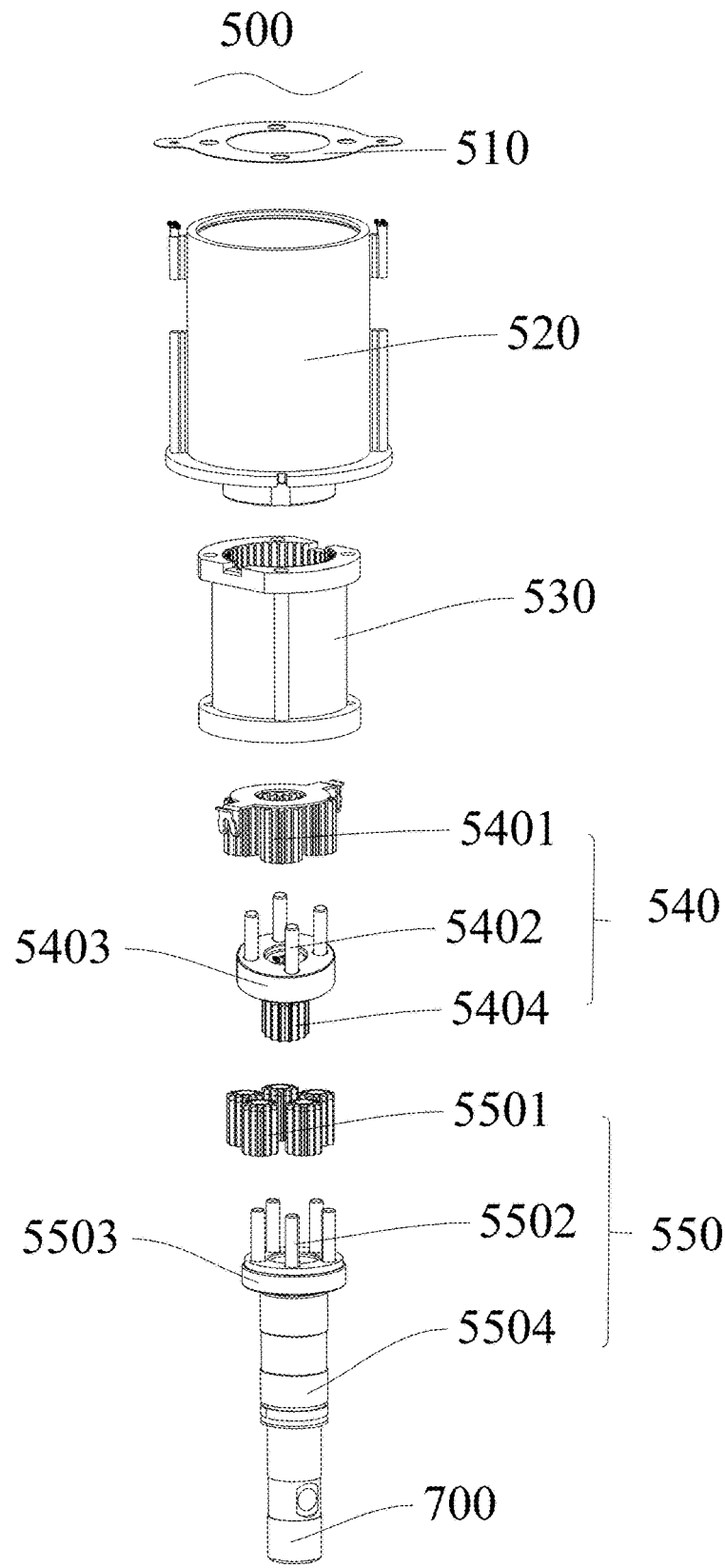
FIG. 15 is a schematic exploded view of the transmission assembly according to at least one embodiment of the disclosure.

Please refer to FIG. 11, FIG. 14 and FIG. 15. In an embodiment of the disclosure, the transmission assembly 500 may include a supporting piece 510, a sleeve barrel 520, a second bearing component 5503, a transmission shaft 5504 and a transmission gear set 560. In an embodiment of the disclosure, the motor assembly 400 may be arranged on the supporting piece 510. The transmission gear set 560 is located in the sleeve barrel 520, and the transmission gear set 560 drives the transmission shaft 5504 to rotate through the second bearing component 5503. The drill pipe connector 700 may be arranged at one end of the transmission shaft 5504 away from the second bearing component 5503, so as to facilitate an external connection with a drill bit to carry out operations.

Please refer to FIG. 11, FIG. 14 and FIG. 15. In an embodiment of the disclosure, the transmission assembly 500 may include a teeth barrel 530, a first transmission portion 540 and a second transmission portion 550. The supporting piece 510 is used to undertake the motor assembly 400, and the supporting piece 510 is arranged on the sleeve barrel 520. The teeth barrel 530 is arranged in the sleeve barrel 520 and is used for being connected with the first transmission portion 540, so that power generated by the motor assembly 400 is further transmitted to a drill bit through the second transmission portion 550. In an embodiment of the disclosure, an inner wall of the teeth barrel 530 is processed with internal teeth, and the internal teeth are engaged with the first transmission portion 540. The first transmission portion 540 may include a first gear set 5401, a first tooth pillar 5402, a first bearing component 5403 and connecting teeth 5404. The first gear set 5401 includes a plurality of gears, the first tooth pillar 5402 includes a plurality of tooth pillars, and a number of gears of the first gear set 5401 is equal to a number of the first tooth pillars 5402. The first gear set 5401 is meshed with the internal teeth of the tooth barrel 530, and the first gear set 5401 is arranged on the first tooth pillar 5402. The first tooth pillar 5402 is located on the first bearing component 5403, and the connecting teeth 5404 are arranged at one end of the first bearing component 5403 away from the first tooth pillar 5402. When the motor assembly 400 is in a working state, the motor drives the tooth barrel 530 to rotate. The teeth barrel 530 drives the first gear set 5401 to rotate, and the first gear set 5401 drives the connecting teeth 5404 to rotate through the first bearing component 5403.

Please refer to FIG. 11, FIG. 14 and FIG. 15. In an embodiment of the disclosure, the second transmission portion 550 may include a second gear set 5501, a second tooth pillar 5502, the second bearing component 5503 and the transmission shaft 5504. The second gear set 5501 includes a plurality of gears, the second tooth pillar 5502 includes a plurality of tooth pillars, and a number of gears of the second gear set 5501 is equal to a number of the second tooth pillars 5502. The second gear set 5501 is meshed with the connecting teeth 5404, and the second gear set 5501 is arranged on the second tooth pillar 5502. The second tooth pillar 5502 is located on the second bearing component 5503, and the transmission shaft 5504 is arranged at one end of the second bearing component 5503 away from the second tooth pillar 5502. When the motor assembly 400 is in the working state, the motor drives the tooth barrel 530 to rotate. The teeth barrel 530 drives the first gear set 5401 to rotate, and the first gear set 5401 drives the connecting teeth 5404 to rotate through the first bearing component 5403. The connecting teeth 5404 drives the second gear set 5501 to rotate, and the second gear set 5501 drives the transmission shaft 5504 to rotate through the second bearing component 5503. One end of the transmission shaft 5504 away from the second bearing component 5503 is provided with the drill pipe connector 700, and the drill bit is driven to rotate through the drill pipe connector 700.

Figure 16:
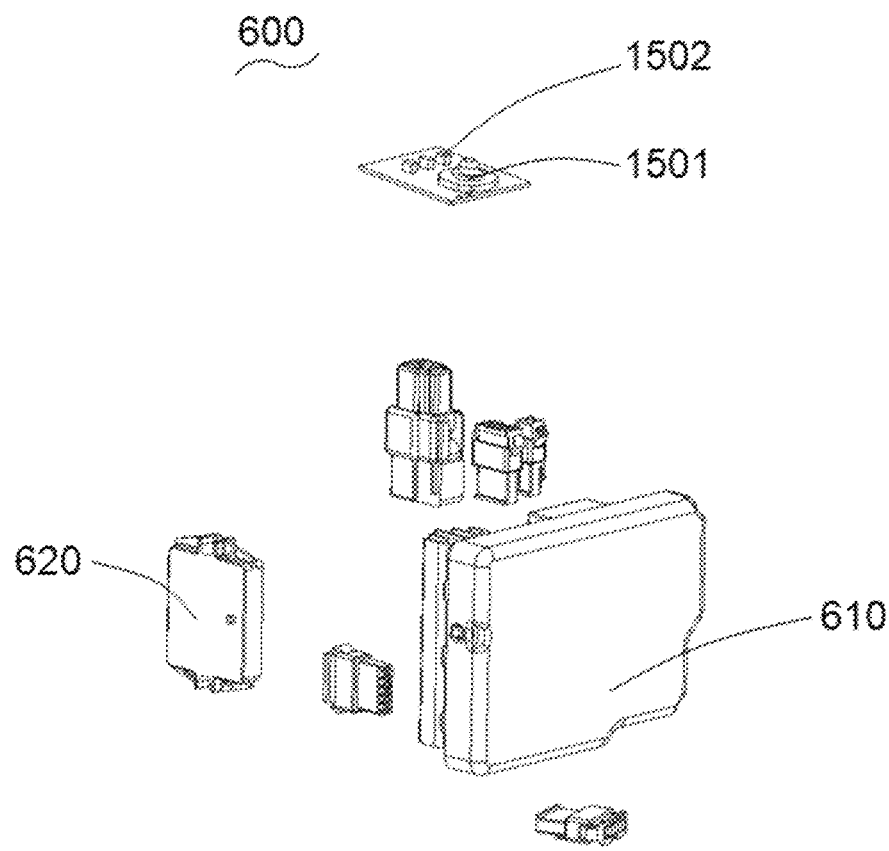
FIG. 16 is a schematic view of a control assembly according to at least one embodiment of the disclosure.
Figure 17:
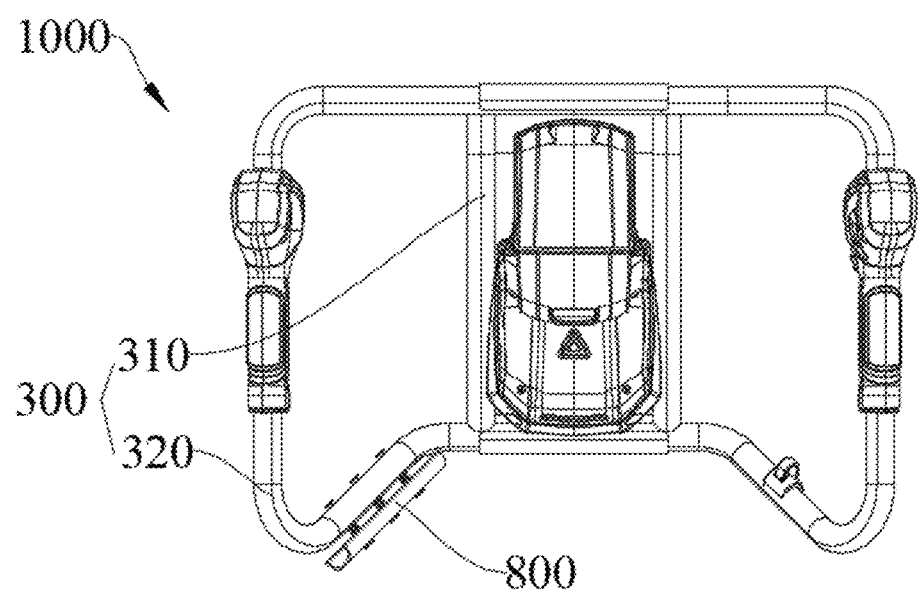
FIG. 17 is a schematic structural view of the earth auger with an anti-impact assembly according to at least one embodiment of the disclosure.
Figure 18:
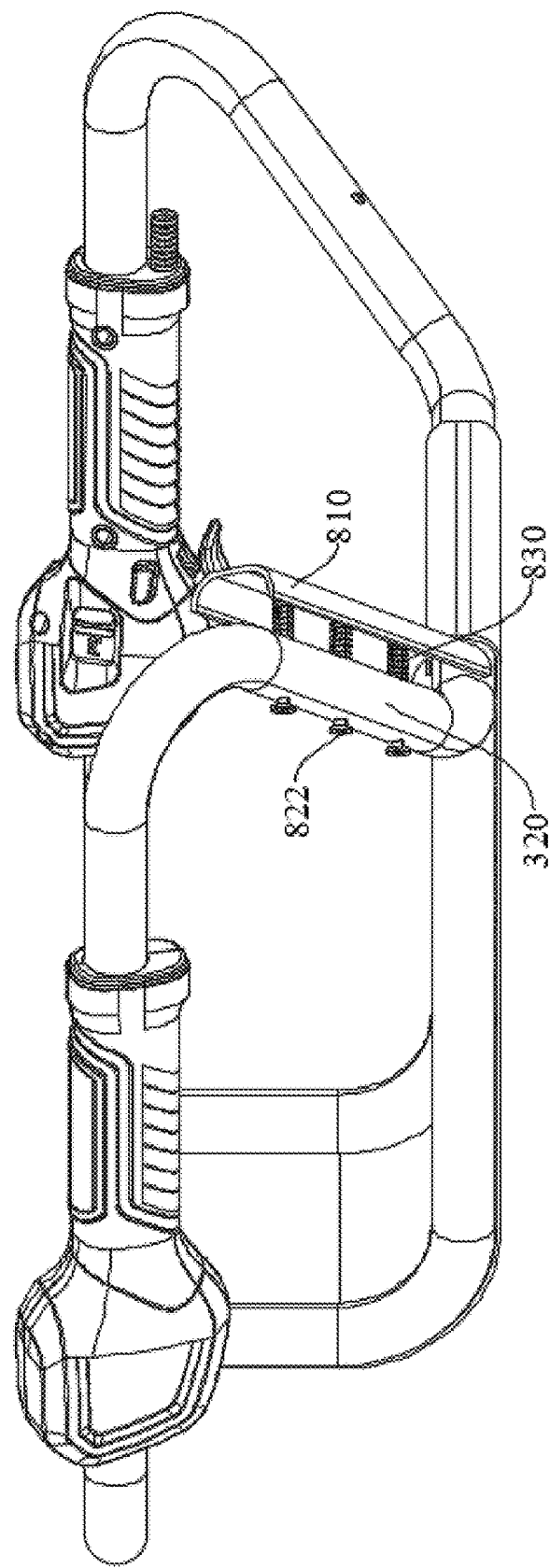
FIG. 18 is a schematic assembly view of the bracket of the earth auger and the anti-impact assembly of the earth auger according to at least one embodiment of the disclosure.
Figure 19:
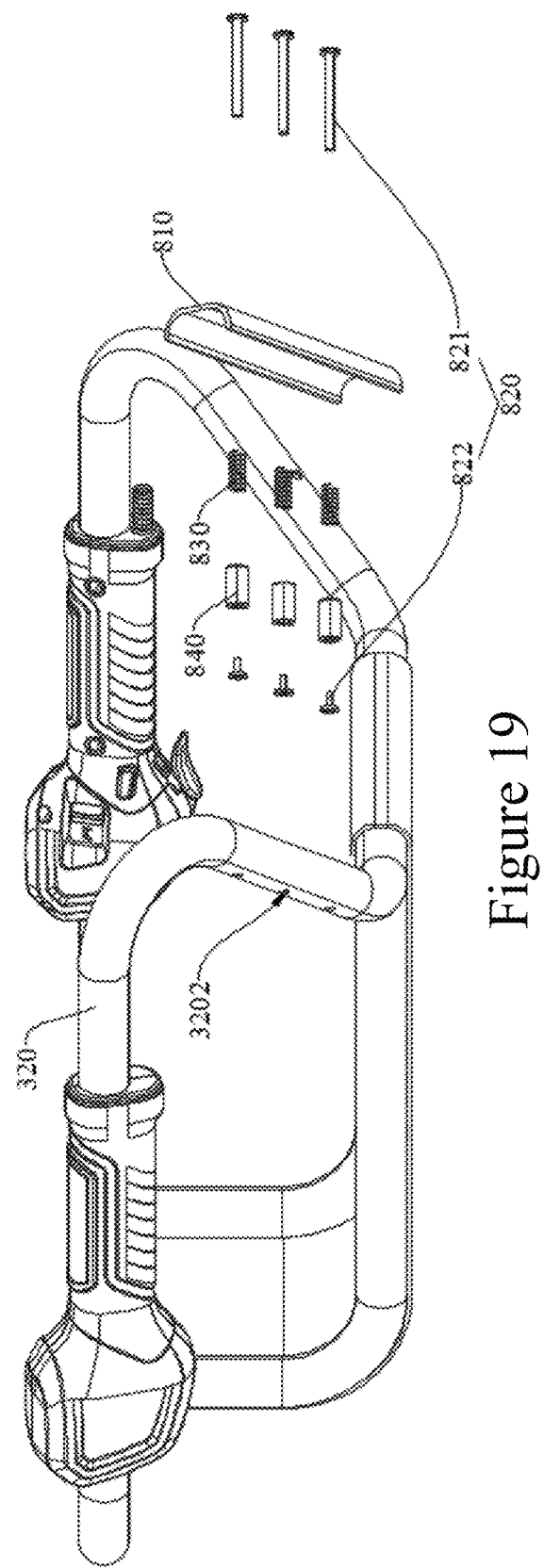
FIG. 19 is a schematic exploded view of the bracket of the earth auger and the anti-impact assembly of the earth auger according to at least one embodiment of the disclosure.
Figure 20:
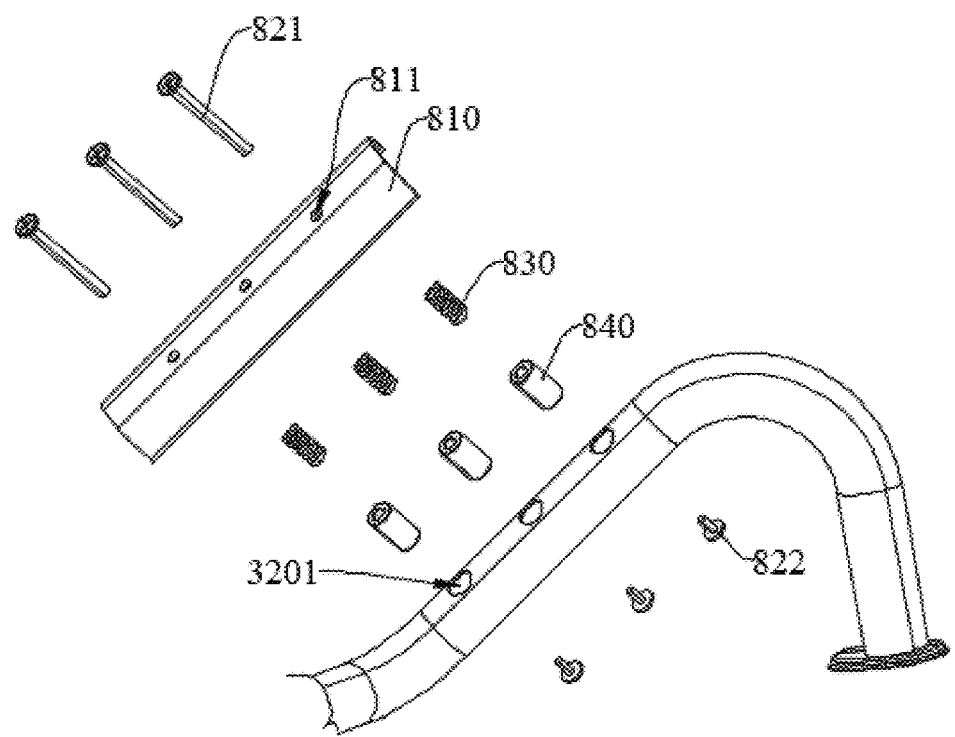
FIG. 20 is a partial exploded view of the bracket of the earth auger and the anti-impact assembly of the earth auger according to at least one embodiment of the disclosure.
Figure 21:
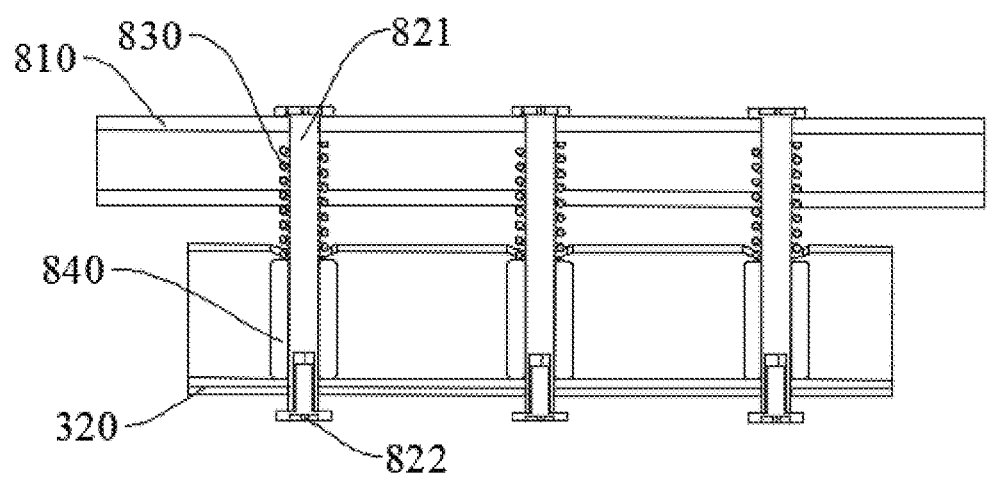
FIG. 21 is a schematic cross-sectional structural view of the bracket of the earth auger and the anti-impact assembly of the earth auger according to at least one embodiment of the disclosure.
Figure 22:
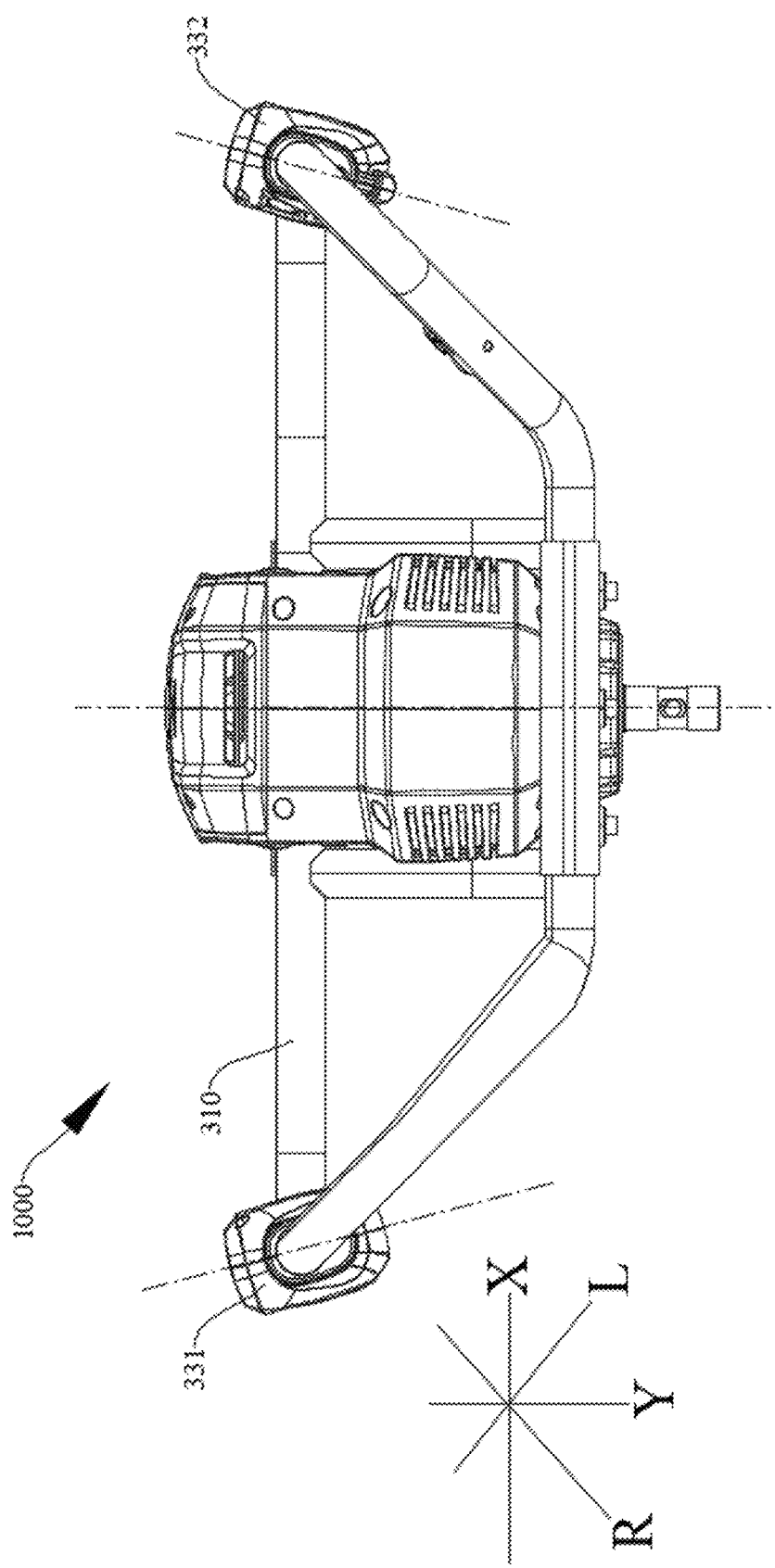
FIG. 22 is a schematic mounting view of the handle in the earth auger according to at least one embodiment of the disclosure.
Figure 23:
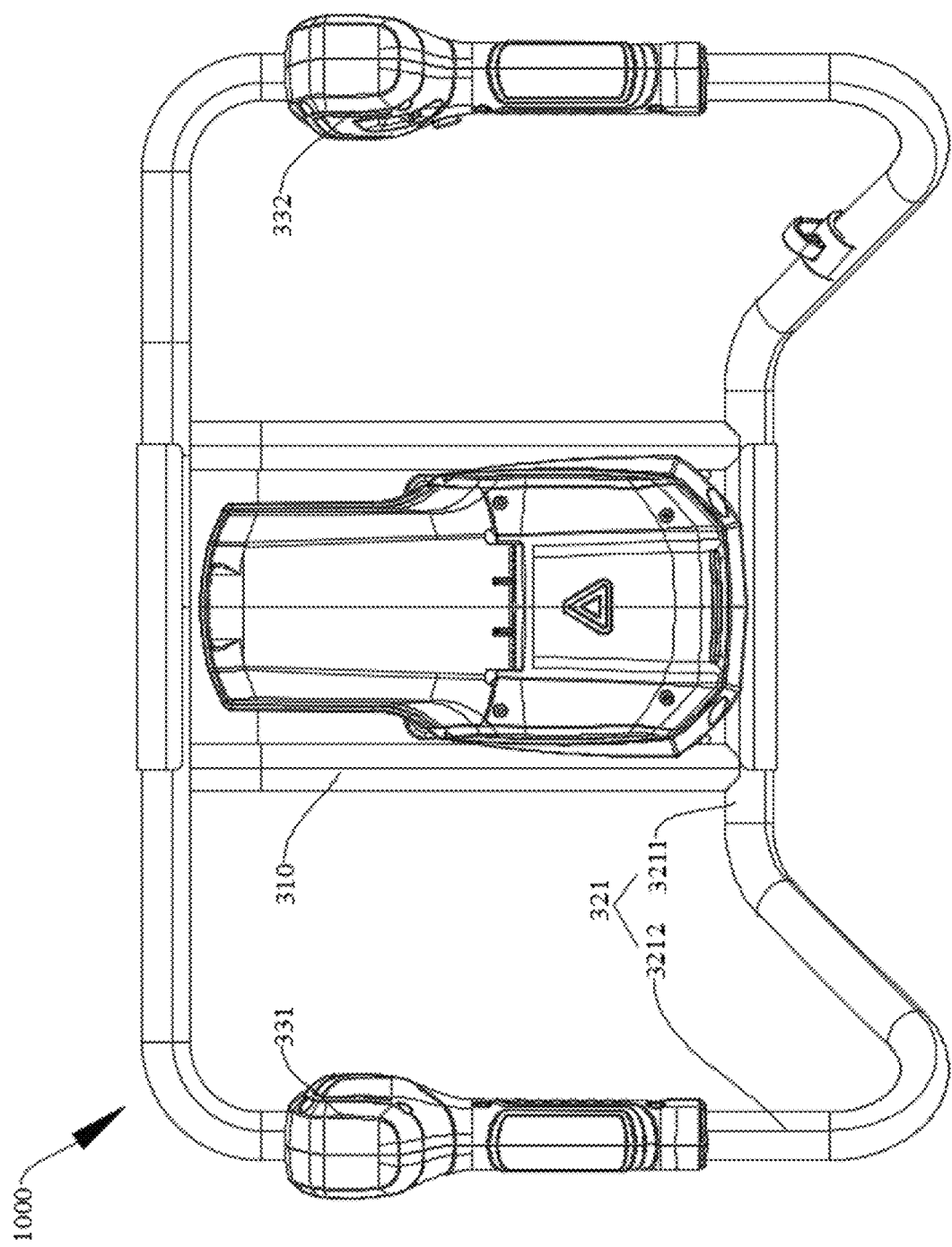
FIG. 23 is a top view of the earth auger according to at least one embodiment of the disclosure.
Figure 24:
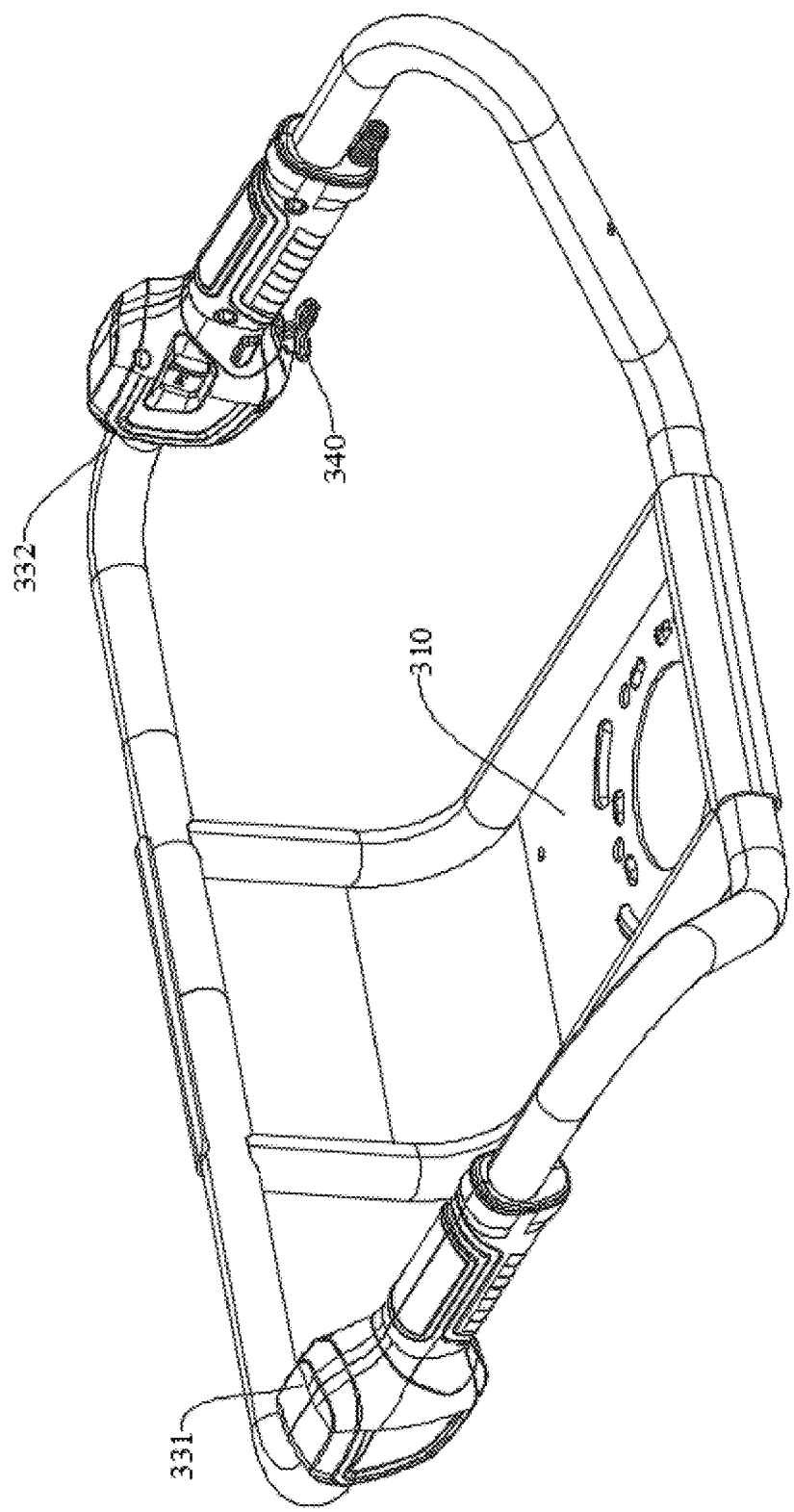
FIG. 24 is a schematic assembly view of a supporting assembly of the earth auger and a handle assembly of the earth auger according to at least one embodiment of the disclosure.
Figure 25:
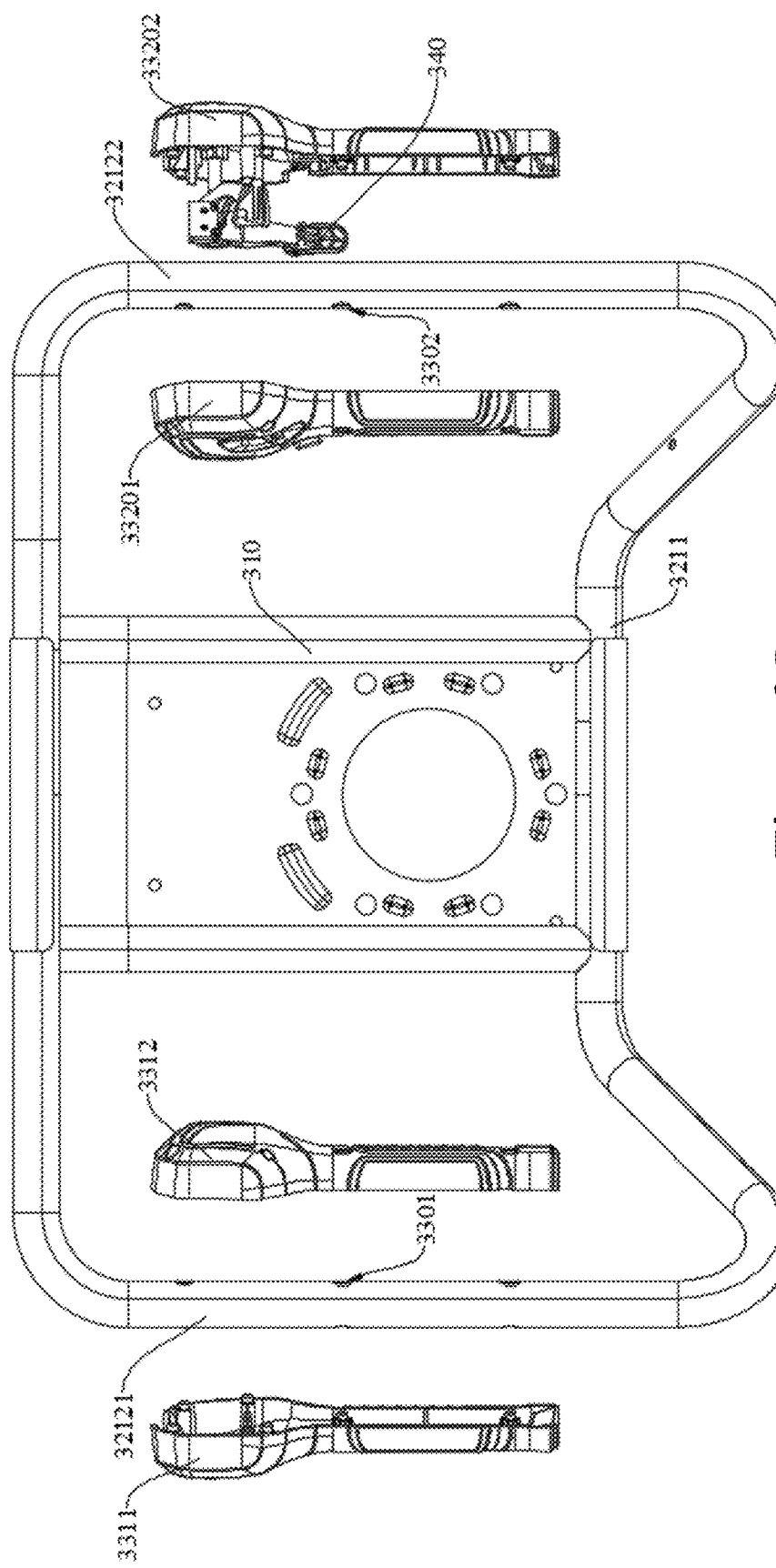
FIG. 25 is a schematic exploded view of the supporting assembly of the earth auger and the handle assembly of the earth auger according to at least one embodiment of the disclosure.
Figure 26:
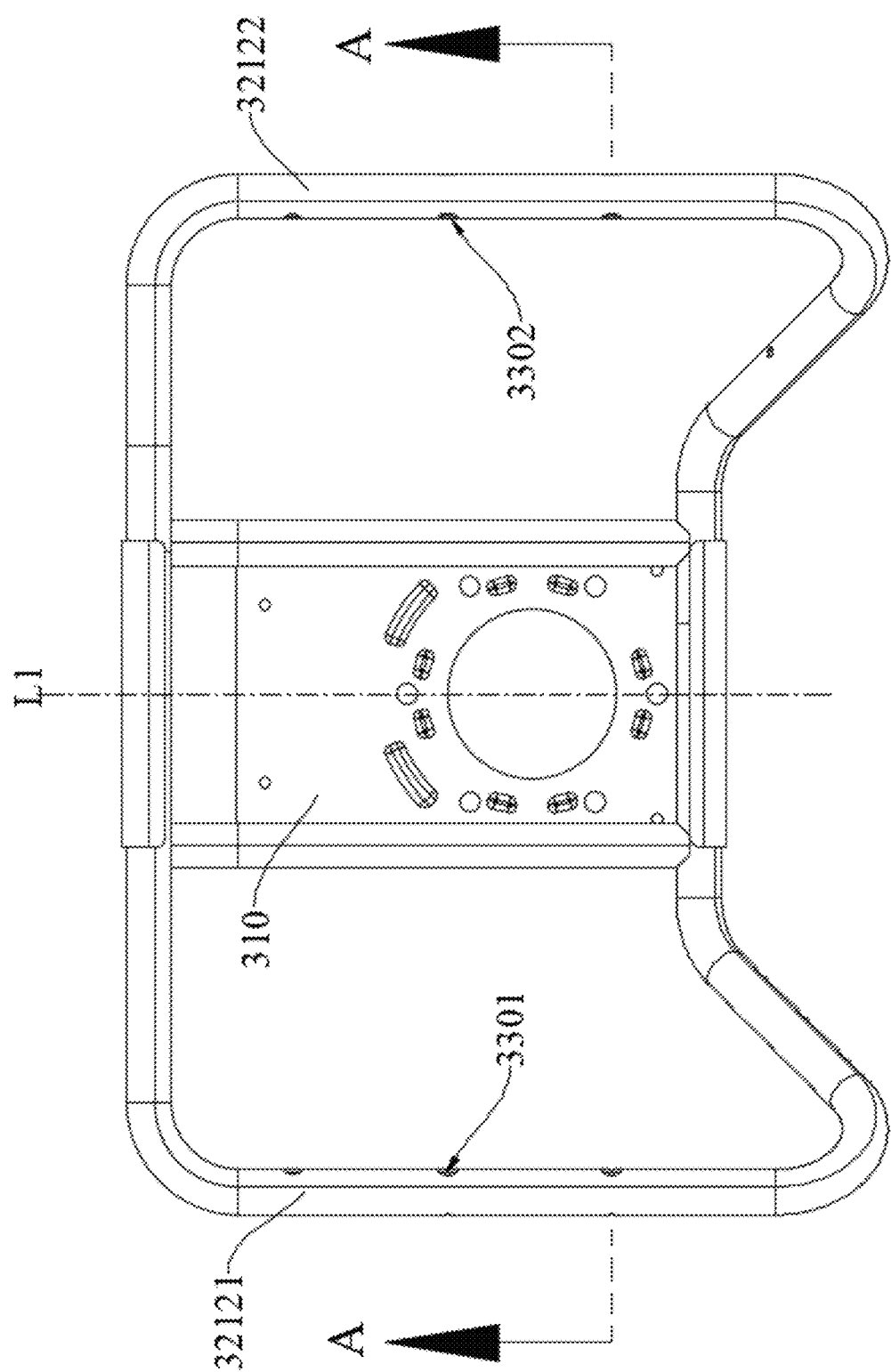
FIG. 26 is a schematic structural view of the bracket in the earth auger according to at least one embodiment of the disclosure.
Figure 27:
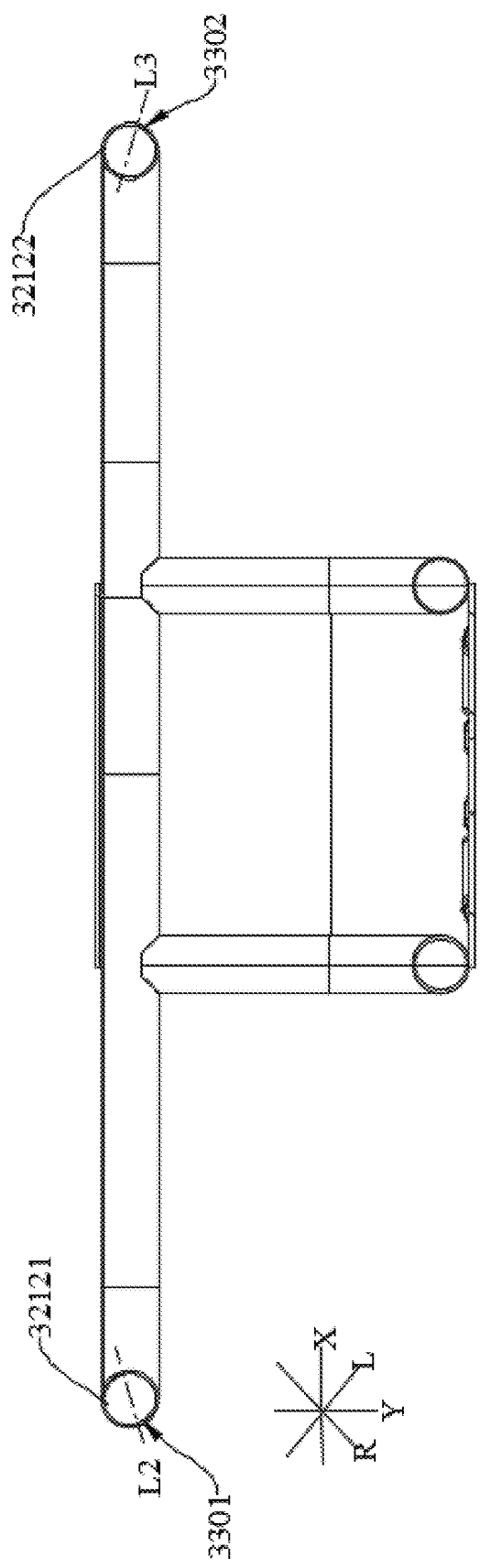
FIG. 27 is a schematic cross-sectional view along A-A in FIG. 26.

Please refer to FIG. 16. In an embodiment of the disclosure, the control assembly 600 further includes a controller 610 and a gyroscope sensor 620. In an embodiment of the disclosure, the transmission assembly 500 is arranged on the connecting base 200, and the motor assembly 400 is connected with the transmission assembly 500. The controller 610 is connected with the motor assembly 400, and the gyroscope sensor 620 is connected with the controller 610 so as to transmit a signal to the controller 610. The control knob 1501 and the indicator light 1502 are arranged on the cover 150. In an embodiment of the disclosure, a number of indicator lights 1502 is for example three. A feedback control is used to monitor the angular velocity and/or angular acceleration of the earth auger itself. When the earth auger is out of control due to a stuck, it may be reflected in a way that the angular velocity or the angular acceleration is abnormal. When the gyroscope sensor 620 detects an abnormal signal, it immediately feedbacks the control signal to the controller 610 and requires an emergency stop in order to protect a safety of the user.

Please refer to FIG. 16. In an embodiment of the disclosure, the gyroscope sensor 620 is connected to the first housing 110 through, for example, a screw connection. In addition to sensing the angular acceleration $\alpha$ and the angular velocity $\omega$, the gyroscope sensor 620 further has a key parameter, which is a feedback time $\Delta t$. In this embodiment, there may be for example three modes, but it is not limited to three modes, and more modes are possible. The three modes in the display module display a mode state through different indicator lights, and the three modes correspond to numerical values of different accelerations $\alpha$, the angular velocities $\omega$ and the feedback times $\Delta t$ respectively. The angular velocity or the angular acceleration monitored by the gyroscope sensor 620 can directly reflect an angular velocity state or an angular acceleration state of the bracket assembly 300 at the moment. When the angular velocity $\omega$ and the angular acceleration $\alpha$ exceed set values, the gyroscope sensor 620 will send the signal to the controller 610, requesting the power supply to be turned off and the motor to perform an emergency stop.

Please refer to FIG. 16. In other embodiments of the disclosure, the number of the indicator lights 1502 may be multiple, such as four, five, six, or eight. The control knob 1501 is adjusted to be in the different indication positions, and when the control knob 1501 is in the different indication positions, the different indicator lights 1502 are lighted up. At the same time, the different indicator lights 1502 correspond to different monitoring parameters, such as the angular velocity, the angular acceleration and the time, etc. According to the type of the ground, the texture and the operating condition, etc., the monitoring parameter of the earth auger may be changed by adjusting the control knob 1501, so as to easily adapt to the safety monitoring and the early warning of the complex terrain and the different operating conditions. In some embodiments of the disclosure, different monitoring mode states of the earth auger may be displayed by a single indicator light 1502, and the different monitoring mode states of the earth auger may also be displayed by the number of indicator lights lighted on.

In summary, the disclosure provides the earth auger. When drilling to a foreign body such as a root of a tree or a stone which may cause a loss of balance or stuck, the dangerous state is monitored in real time, and the danger information is transmitted to an operator and an emergency stop is controlled, so that an occurrence of accidents may be effectively prevented, and an operation safety is improved. The earth auger may be used in a variety of surface environments. When the earth auger is out of control due to the stuck during working, it may monitor the abnormal signal at this time, and immediately feedback the control signal to the control assembly to require the earth auger to stop urgently, so as to avoid injury to the operator. The earth auger of the disclosure may adapt to a safety monitoring and early warning of complex terrain and different operating conditions.

Please refer to FIG. 17 through FIG. 21. The disclosure provides a kind of stuck anti-impact structure of the earth auger and earth auger, so that when the earth auger is drilled to a root of a tree or drilled to a stone, etc. which causes the stuck, a reaction torque beyond the operator's control range is avoided, thereby avoiding a loss of control of the earth auger and injury accidents. In an embodiment, the earth auger 1000 further includes a drill pipe assembly and an anti-impact assembly 800. The drill pipe assembly is connected with the motor assembly 400 for transmission, and the motor assembly 400 is used to drive the drill pipe assembly to work. The anti-impact assembly 800 is mounted on the bracket 320, which is used to buffer a reaction moment generated when the earth auger drills into tree roots or rocks and results the stuck. The handle assembly is mounted on the bracket 320 of the bracket assembly 300.

Please refer to FIG. 17 through FIG. 21. In an embodiment of the disclosure, the anti-impact structure includes the bracket 320 and the anti-impact assembly 800 mounted on the bracket 320. In an embodiment, the anti-impact assembly 800 includes a blocking plate 810, a plurality of fastening bolt assemblies 820, a plurality of buffer components 830 and a plurality of guide sleeves 840. The blocking plate 810, the buffer components 830 and the guide sleeves 840 are mounted together with the bracket 320 through the plurality of fastening bolt assemblies 820. In an embodiment of the disclosure, the blocking plate 810 is provided with a plurality of through holes 811. The blocking plate 810 is mounted together with the bracket 320 through the plurality of fastening bolt assemblies 820 passing through the through holes 811. And the buffer components 830 are respectively sleeved on the plurality of fastening bolt assemblies 820 and are located between the brackets 320 and the blocking plate 810. A shape of the blocking plate 810 is adapted to a shape of the bracket 320. For example, the blocking plate 810 is set as a large-area element to receive an impact from an outside, and a contact stress is reduced through the large area to play the role of buffer.

Please refer to FIG. 17 through FIG. 21. In an embodiment of the disclosure, the bracket 320 is a hollow tubular structure. For example, it is set as a round tube structure. A plurality of first mounting holes 3201 and a plurality of second mounting holes 3202 are arranged radially along the bracket 320, and the first mounting holes 3201 are disposed coaxially with the second mounting holes 3202. And a diameter of the first mounting hole 3201 is larger than a diameter of the second mounting hole 3202 so as to facilitate a mounting of the anti-impact assembly 800. In an embodiment of the disclosure, the plurality of first mounting holes 3201 and the plurality of second mounting holes 3202 are respectively located on a same straight line. In addition, in an embodiment of the disclosure, a diameter of the guide sleeve 840 is larger than the diameter of the second mounting hole 3202 and is matched with the diameter of the first mounting hole 3201. In an embodiment, the plurality of guide sleeve 840 are respectively arranged in the bracket 320 from the first mounting hole 3201, and a limit is formed between the guide sleeve and the bracket 320, so as to ensure a freedom of the whole structure, and only generate an axial sliding.

Please refer to FIG. 17 through FIG. 21. In an embodiment of the disclosure, the fastening bolt assembly 820 penetrates the blocking plate 810 and the guide sleeve 840, and is fixedly mounted together with the bracket 320. In an embodiment of the disclosure, the fastening bolt assembly 820 includes a fastening bolt 821 and a fastening nut 822. One end of the fastening bolt 821 is provided with a threaded hole, so that the fastening nut 822 is connected with the fastening bolt 821 through the threaded hole.

Please refer to FIG. 17 through FIG. 21. In an embodiment of the disclosure, the guide sleeve 840 is mounted inside the bracket 320. The fastening bolt 821 passes through the blocking plate 810 and the guide sleeve 840 in turn and extending to the second mounting hole 3202. The fastening nut 822 passes through the second mounting hole 3202 and is fixedly connected with the fastening bolt 322 through the threaded hole. It should further be noted that, when mounting, the buffer component 830 is sleeved on the fastening bolt 821 and is located between the guide sleeve 840 and the blocking plate 810. In an embodiment of the disclosure, the buffer component 830 is for example set as a buffer spring and sleeved on the fastening bolt 821 of the fastening bolt assembly 820, so that the blocking plate 810, the buffer component 830 and the guide sleeve 840 are mounted on the bracket 320, and the blocking plate 810, the buffer component 830 and the guide sleeve 840 may be limited.

Please refer to FIG. 17 through FIG. 21. In an embodiment of the disclosure, when mounting the anti-impact assembly 800, the plurality of fastening bolts 821 passes through the through holes 811 on the blocking plate 810, then one end of each fastening bolt 821 passing through the blocking plate 810 is sleeved with the buffer components 830, for example, sleeved with the buffer springs, which means that the buffer components 830 are located below the blocking plate 810. Then the guide sleeve 840 is mounted on the bracket 320, and then the fastening bolts 821 passing through the blocking plate 810 and the buffer component 830 extend into the guide sleeves 840. The fastening nuts 822 extend into the guide sleeves 840 from the second mounting hole 3202, and are fixedly connected with the fastening bolts 821 through the threaded holes, thereby the blocking plate 810, the buffer components 830 and the guide sleeves 840 are arranged on the bracket 320, and the blocking plate 810, the buffer components 830 and the guide sleeves 840 may be limited, so as to realize the mounting of the anti-impact assembly 800.

In summary, the disclosure provides the stuck anti-impact structure of the earth auger and earth auger. The anti-impact assembly is mounted on the bracket, and the anti-impact assembly includes the blocking plate and the buffer components. When the blocking plate is impacted, the buffer components are compressed to absorb impact energy, so as not to cause impact damage to the user, which allows it to achieve a purpose of buffer, and ultimately achieves a purpose of eliminating a possibility of injury. And through an elastic structure, impact time may be prolonged through a conversion of kinetic energy to potential energy, and finally a damage caused by impact is eliminated, so as to add a more reliable protection function to the user.

Please refer to FIG. 22 through FIG. 27. In an embodiment of the disclosure, through redesigning a positioning angle of the control handle and the auxiliary handle, an arrangement of a symmetrical plane of the earth auger parallel to an assembly parting surface of the traditional control handle assembly is improved, which leads to an angle between the wrist and the arm during an actual use of the earth auger and causes uncomfortable problems during an exertion. In an embodiment, the first bracket 321 and the second bracket 322 both include a main bracket 3211 and armrest bracket 3212 arranged on two sides of the main bracket 3211. The supporting platform 310 is arranged between the two main brackets 3211, and the armrest brackets 3212 on the two sides of the main bracket 3211 are symmetrically arranged about a vertical plane where a center line L1 of the main bracket 3211 is located, which means the armrest brackets 3212 are symmetrically arranged about the vertical plane that is arranged along the center line L1 in a Y direction, and the vertical plane where the center line L1 is located is a symmetrical plane of the earth auger 1000.

Please refer to FIG. 22 through FIG. 25. In an embodiment of the disclosure, the handle assembly includes the auxiliary handle 331 and the control handle 332. The auxiliary handle 331 and the control handle 332 are respectively arranged on the armrest brackets 3212 on the two sides of the main bracket 3211. In this embodiment, housings of the auxiliary handle 331 and the control handle 332 both include two symmetrical half-housings, bottoms of the auxiliary handle 331 and the control handle 332 both point obliquely downward directed to the vertical plane where the centerline L1 is located, and there are acute angles between the auxiliary handle 331 and the vertical plane where the centerline L1 is located, and between the control handle 332 and the vertical plane where the centerline L1 is located.

Please refer to FIG. 22 through FIG. 25. In an embodiment of the disclosure, the armrest bracket 3212 includes a first armrest bracket 32121 and a second armrest bracket 32122. The first armrest bracket 32121 and the second armrest bracket 32122 are symmetrically arranged on two sides of the main bracket 3211, the auxiliary handle 331 is arranged on the first armrest bracket 32121, and the control handle 332 is arranged on the second armrest bracket 32122.

Please refer to FIG. 22 through FIG. 27. In an embodiment of the disclosure, a plurality of auxiliary handle mounting holes 3301 is arranged on the first armrest bracket 32121, and axes L2 of the plurality of auxiliary handle mounting holes 3301 are arranged obliquely downward to one side away from the second armrest bracket 32122, which means being arranged along a direction R in FIG. 22, and there is an angle with a horizontal direction X. The auxiliary handle 331 is fixedly mounted on the first armrest bracket 32121 through fixing bolts, the bottom of the auxiliary handle 331 obliquely downward pointed to the vertical plane where the center line L1 is located, and there is an acute angle between the auxiliary handle 331 and the vertical plane where the centerline L1 is located. In an embodiment of the disclosure, the acute angle is between 15° and 30° for example. Further, the acute angle may also be between 20° and 25°, so that when the earth auger is in the actual use, a distribution of arm, wrist and palm is more reasonable and in line with ergonomic requirements.

Please refer to FIG. 22 through FIG. 27. In an embodiment of the disclosure, the auxiliary handle 331 includes a first auxiliary handle housing 3311 and a second auxiliary handle housing 3312. The first auxiliary handle housing 3311 is connected with the second auxiliary handle housing 3312 through the fixing bolts. A contact surface between the first auxiliary handle housing 3311 and the second auxiliary handle housing 3312 is a first parting surface, and a direction of the first parting surface is consistent with a direction to which the bottom of the auxiliary handle 331 faces, which means that an angle between the first parting surface and the vertical plane where the center line L1 is located is the same as the angle between the auxiliary handle and the vertical plane where the center line is located, which also means the first parting surface on the auxiliary handle 331 obliquely points downward to the vertical plane where the center line L1 is located, so that there is an acute angle between the first parting surface on the auxiliary handle 331 and the vertical plane where the center line L1 is located.

Please refer to FIG. 22 through FIG. 27. In an embodiment of the disclosure, when mounting, an armrest bracket arranged with the auxiliary handle mounting holes 3301 is wrapped by the first auxiliary handle housing 3311 and the second auxiliary handle housing 3312, and the fixing bolts pass through the auxiliary handle mounting holes 3301 so that the auxiliary handle 331 and the first armrest bracket 32121 are fixedly mounted together, which enables the bottom of the auxiliary handle 331 to obliquely point downward to the vertical plane where the center line L1 is located, and there is the acute angles between the auxiliary handle 331 and the vertical plane where the centerline L1 is located. In an embodiment of the disclosure, the acute angle is between 15° and 30° for example. Further, the acute angle may also be between 20° and 25°, so that when the earth auger is in the actual use, the distribution of arm, wrist and palm is more reasonable and in line with ergonomic requirements.

Please refer to FIG. 22 through FIG. 27. In an embodiment of the disclosure, a plurality of control handle mounting holes 3302 is arranged on the second armrest bracket 32122, and axes L3 of the plurality of control handle mounting holes 3302 are arranged obliquely downward directed to one side away from the first armrest bracket 32121, which means being arranged along a direction L in FIG. 6, and there is an angle with a horizontal direction X similarly. The control handle 332 is fixedly mounted on the second armrest bracket 32122 through fixing bolts, the bottom of the control handle 332 obliquely points downward to the vertical plane where the center line L1 is located, and the acute angles is arranged between the control handle 332 and the vertical plane where the centerline L1 is located. In an embodiment of the disclosure, the acute angle is between 15° and 30° for example. Further, the acute angle may also be between 20° and 25°, so that when the earth auger is in the actual use, the distribution of arm, wrist and palm is more reasonable and in line with ergonomic requirements.

Please refer to FIG. 22 through FIG. 27. In an embodiment of the disclosure, the control handle housing 3321 includes a first control handle housing 33201 and a second control handle housing 33202. The first control handle housing 33201 is connected with the second control handle housing 33202 through the fixing bolts. A contact surface between the first control handle housing 33201 and the second control handle housing 33202 is a second parting surface, and a direction of the second parting surface is consistent with a direction to which the bottom of the control handle 332 faces, which means that an angle between the second parting surface and the vertical plane where the center line L1 is located is the same as the angle between the control handle 332 and the vertical plane where the center line is located, which also means the second parting surface on the control handle 332 obliquely points downward to the vertical plane where the center line L1 is located, so that there is an acute angle of a same size between the second parting surface on the control handle 331 and the vertical plane where the center line L1 is located. In addition, it should be noted that, the trigger 340 is arranged at a bottom of the control handle 332 for triggering a switch, so as to control the earth auger to work.

Please refer to FIG. 22 through FIG. 27. In an embodiment of the disclosure, when mounting, an armrest bracket arranged with the control handle mounting holes 402 is wrapped by the first control handle housing 33201 and the second control handle housing 33202, and the fixing bolts pass through the control handle mounting holes 402 so that the control handle 332 and the second armrest bracket 32122 are fixedly mounted together, which enables the bottom of the control handle 332 to obliquely point downward to the vertical plane where the center line L1 is located, and there is the acute angles between the control handle 332 and the vertical plane where the centerline L1 is located. In an embodiment of the disclosure, the acute angle is between 15° and 30° for example. Further, the acute angle may also be between 20° and 25°, so that when the earth auger is in the actual use, the distribution of arm, wrist and palm is more reasonable and in line with ergonomic requirements. It should be noted that, in some embodiments, the angle formed between the auxiliary handle 331 and the vertical plane where the center line L1 is located is the same as the angle formed between the control handle 332 and the vertical plane where the center line L1 is located.

The disclosure provides a handle assembly of the earth auger and the earth auger. Through mounting the auxiliary handle and the control handle on the armrest brackets of the two sides of the main bracket respectively, there are acute angles between the parting surfaces of the auxiliary handle and/or the control handle and the vertical plane where the center line is located, so that there are acute angles between the assembly parting surface of the control handle of the product and the symmetrical plane of the whole machine, and between the auxiliary handle of the product and the symmetrical plane of the whole machine. This layout mode is more ergonomic, and more labor-saving in a process of using the earth auger. That means that, through redesigning the positioning angle of the control handle and the auxiliary handle, the assembly parting surfaces of the auxiliary handle and the control handle form the acute angles with the symmetrical plane of the earth auger, so that the distribution of the arm, wrist and palm of the earth auger is more reasonable and more in line with the requirements of ergonomics in the actual use.

The above description is only one or more embodiments of the disclosure and an explanation of the technical principle used. Those skilled in the art should understand that a disclosure scope involved in this disclosure is not limited to the technical solutions formed by the specific combination of the above technical features. At the same time, it should also cover other technical solutions formed by any combination of the above technical features or their equivalent features without departing from a concept of the disclosure, such as a technical solution formed by replacing the above-mentioned features with technical features with similar functions disclosed in (but not limited to) this disclosure.

Except for the technical features the in the specification, the remaining technical features are known to those skilled in the art, in order to highlight the innovative features of the disclosure, the remaining technical features will not be repeated herein.

What is claimed is:

1. An earth auger, comprising:
a transmission assembly, arranged on a connecting base;
a motor assembly, connected with the transmission assembly, and configured to drive the transmission assembly to rotate;
a controller, arranged at a first side of the transmission assembly, connected with the motor assembly, and configured to control a rotation of the motor assembly through an on-off of a circuit;
a control knob and a plurality of indicator lights, arranged on a housing, the control knob configured to set critical values of angular velocities of different gears and set critical values of angular accelerations of the different gears, and the indicator lights configured to display a current gear;
a gyroscope sensor, arranged at a second side of the transmission assembly,
wherein, the gyroscope sensor is configured to obtain angular velocity information and angular acceleration information during a movement of the earth auger, to feedback a monitored signal to the controller, and when the monitored signal exceeds a preset critical value of the current gear, the controller stops power supply to stop the motor from rotating; and
a bracket, installed with an anti-impact assembly, wherein, the anti-impact assembly comprises:
a blocking plate,
a plurality of fastening bolt assemblies, passing through the blocking plate and mounted with the bracket; and
a plurality of buffer components, sleeved on the fastening bolt assembly and located between the blocking plate and the bracket.

2. The earth auger according to claim 1, wherein, a plurality of first mounting holes and a plurality of second mounting holes are arranged on the bracket, the first mounting holes are disposed coaxially with the second mounting holes, and a diameter of the first mounting holes is larger than a diameter of the second mounting holes.

3. The earth auger according to claim 2, wherein, the anti-impact assembly further comprises a plurality of guide sleeves, the guide sleeves are arranged in the bracket from the first mounting holes, and a limit is defined between the guide sleeves and the bracket.

4. The earth auger according to claim 3, wherein, a diameter of the guide sleeves is larger than a diameter of the second mounting holes, and is matched with a diameter of the first mounting holes.

5. The earth auger according to claim 3, wherein, the fastening bolt assembly is configured to penetrate through the blocking plate and the guide sleeves, and connect the blocking plate and the guide sleeves to the bracket.

6. The earth auger according to claim 1, wherein, the housing comprises a first housing and a second housing, and the controller is arranged on the first housing.

7. The earth auger according to claim 6, wherein, tops of the first housing and the second housing form an opening.

8. The earth auger according to claim 7, wherein, a cover is arranged on the opening.

9. The earth auger according to claim 8, wherein, the control knob and the plurality of the indicator lights are arranged on the cover, and the control knob is connected with the controller to set the critical values of angular velocities and the critical values of angular accelerations of the different gears.

10. The earth auger according to claim 1, wherein, the gyroscope sensor is connected with the controller and feedbacks a monitored signal of the angular velocities and a monitored signal of the angular accelerations to the controller.

11. The earth auger according to claim 1, wherein, the indicator lights comprise a first indicator light, a second indicator light and a third indicator light, the first indicator light, the second indicator light and the third indicator light are adjusted by the control knob to display the current gear.

12. The earth auger according to claim 1, wherein, the gyroscope sensor is configured to monitor signals of the angular velocity and the angular acceleration of the earth auger in real time, and filter noise information to obtain a real-time working state of the earth auger.

13. The earth auger according to claim 1, wherein, the transmission assembly comprises a first transmission portion and a second transmission portion, one end of a first bearing component of the first transmission portion is provided with a connecting gear, and the first transmission portion is connected with the second transmission portion through the connecting gear.

14. The earth auger according to claim 13, wherein, one end of a transmission shaft of the second transmission portion is provided with an drill pipe connector, and the drill pipe connector is connected with a drill bit and configured to drive the drill bit to rotate.

* * * * *